(12) United States Patent
Durham

(10) Patent No.: US 11,868,273 B2
(45) Date of Patent: *Jan. 9, 2024

(54) MEMORY PROTECTION WITH HIDDEN INLINE METADATA TO INDICATE DATA TYPE

(71) Applicant: Intel Corporation, Santa Clara, CA (US)

(72) Inventor: David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 706 days.

This patent is subject to a terminal disclaimer.

(21) Appl. No.: 16/458,007

(22) Filed: Jun. 29, 2019

(65) Prior Publication Data

US 2020/0409868 A1    Dec. 31, 2020

(51) Int. Cl.
| | |
|---|---|
| *G06F 12/14* | (2006.01) |
| *G06F 12/10* | (2016.01) |
| *G06F 12/1009* | (2016.01) |
| *G06F 12/1027* | (2016.01) |

(52) U.S. Cl.
CPC ...... *G06F 12/1408* (2013.01); *G06F 12/1009* (2013.01); *G06F 12/1425* (2013.01); *G06F 12/1027* (2013.01)

(58) Field of Classification Search
CPC ............. G06F 12/1408; G06F 12/0895; G06F 12/1425; G06F 12/1027; G06F 12/1009; G06F 12/14

See application file for complete search history.

(56) References Cited

U.S. PATENT DOCUMENTS

| | | | | |
|---|---|---|---|---|
| 7,281,102 | B1* | 10/2007 | Agesen | G06F 12/1458 711/158 |
| 9,910,793 | B2* | 3/2018 | Chhabra | G06F 13/16 |
| 11,003,584 | B2* | 5/2021 | Cong | G06F 21/53 |
| 11,288,213 | B2* | 3/2022 | Durham | G06F 12/1027 |
| 2009/0113425 | A1* | 4/2009 | Ports | G06F 9/4881 718/1 |
| 2009/0319806 | A1* | 12/2009 | Smith | G06F 21/575 726/19 |
| 2013/0060796 | A1* | 3/2013 | Gilg | G06Q 30/0605 707/756 |
| 2017/0206172 | A1* | 7/2017 | Ma | G06F 12/08 |
| 2017/0264640 | A1* | 9/2017 | Narayanaswamy | H04L 63/0281 |

(Continued)

OTHER PUBLICATIONS

European Search Report and Search Opinion, EP App. No. 20163788. 1, dated Oct. 5, 2020, 7 pages.

(Continued)

*Primary Examiner* — Pierre Michel Bataille
(74) *Attorney, Agent, or Firm* — Nicholson De Vos Webster & Elliott LLP

(57) ABSTRACT

Embodiments are directed to memory protection with hidden inline metadata to indicate data type and capabilities. An embodiment of a processor includes a processor core and cache memory. The processor core is to implant hidden inline metadata in one or more cachelines for the cache memory, the hidden inline metadata hidden at a linear address level, hidden from software, the hidden inline metadata to indicate data type or capabilities for the associated data stored on the same cacheline.

20 Claims, 19 Drawing Sheets

(56) References Cited

U.S. PATENT DOCUMENTS

2019/0042799 A1    2/2019  Lemay et al.
2019/0095355 A1*   3/2019  Timbert ............... G06F 21/602
2019/0196977 A1    6/2019  Cong et al.

OTHER PUBLICATIONS

Ferraiuolo et al., "HyperFlow: A Processor Architecture for Nonmalleable, Timing-Safe Information Flow Security", Association for Computing Machinery, CCS' 18, Oct. 15-19, 2018, pp. 1583-1600.
Office Action, EP App. No. 20163788.1, dated Nov. 15, 2022, 5 pages.

* cited by examiner

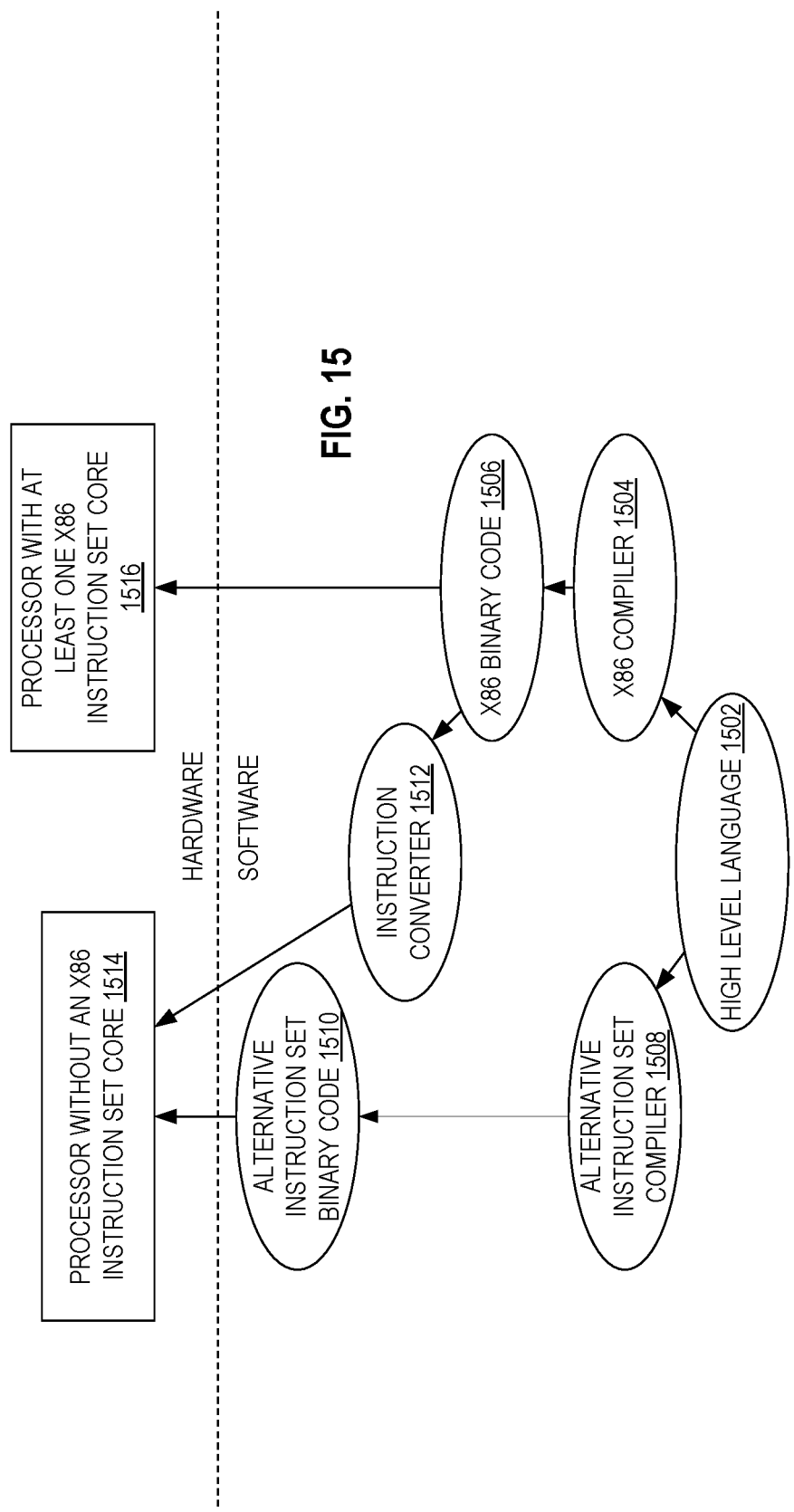

US 11,868,273 B2

MEMORY PROTECTION WITH HIDDEN INLINE METADATA TO INDICATE DATA TYPE

TECHNICAL FIELD

Embodiments described herein generally relate to the field of electronic devices and, more particularly, memory protection with hidden inline metadata.

BACKGROUND

"Spectre" induces a system to speculatively perform operations that would not occur during correct program execution and which leak private, confidential, and/or secret information. "Meltdown" breaks all of the assumptions inherent in address space isolation and exploits out-of-order execution to read arbitrary kernel memory locations that may include private, confidential, and/or secret information. Both Spectre and Meltdown communicate the illicitly obtained private, confidential, and/or secret information to an adversary via a side-channel. Operating system (OS) and central processing unit (CPU) microcode patch-based mitigations for speculative execution-based vulnerabilities such as Spectre and Meltdown can be improved by making the CPU aware of a program's intent by labeling the program data with metadata so that the hardware can operate on the data with full knowledge of its bounds, type, current assignment, etc.

Existing and potential hardware and software architectures manifest additional security vulnerabilities. For example, some architectures may be susceptible to memory pointers being overwritten. As another example, some architectures may be susceptible to memory pointers manipulation (value added) that cause the pointers to land on a wrong (unauthorized) data object, either in space or in time. As another example, some architectures may be limited in the granularity for which they provide protection. What is needed is a technical solution to these security vulnerabilities by allowing the hardware to know the software's intent.

BRIEF DESCRIPTION OF THE DRAWINGS

Embodiments described here are illustrated by way of example, and not by way of limitation, in the figures of the accompanying drawings in which like reference numerals refer to similar elements.

FIG. 11 shows a block diagram of a system in accordance with one embodiment of the present invention;

FIG. 12 is a block diagram of a first more specific exemplary system in accordance with an embodiment of the present invention;

FIG. 13 is a block diagram of a second more specific exemplary system in accordance with an embodiment of the present invention;

FIG. 14 is a block diagram of a system-on-chip (SoC) in accordance with an embodiment of the present invention;

FIG. 15 is a block diagram contrasting the use of a software instruction converter to convert binary instructions in a source instruction set to binary instructions in a target instruction set according to embodiments of the invention.

DETAILED DESCRIPTION

Embodiments described herein are directed to memory protection with hidden inline metadata.

Figure 9:
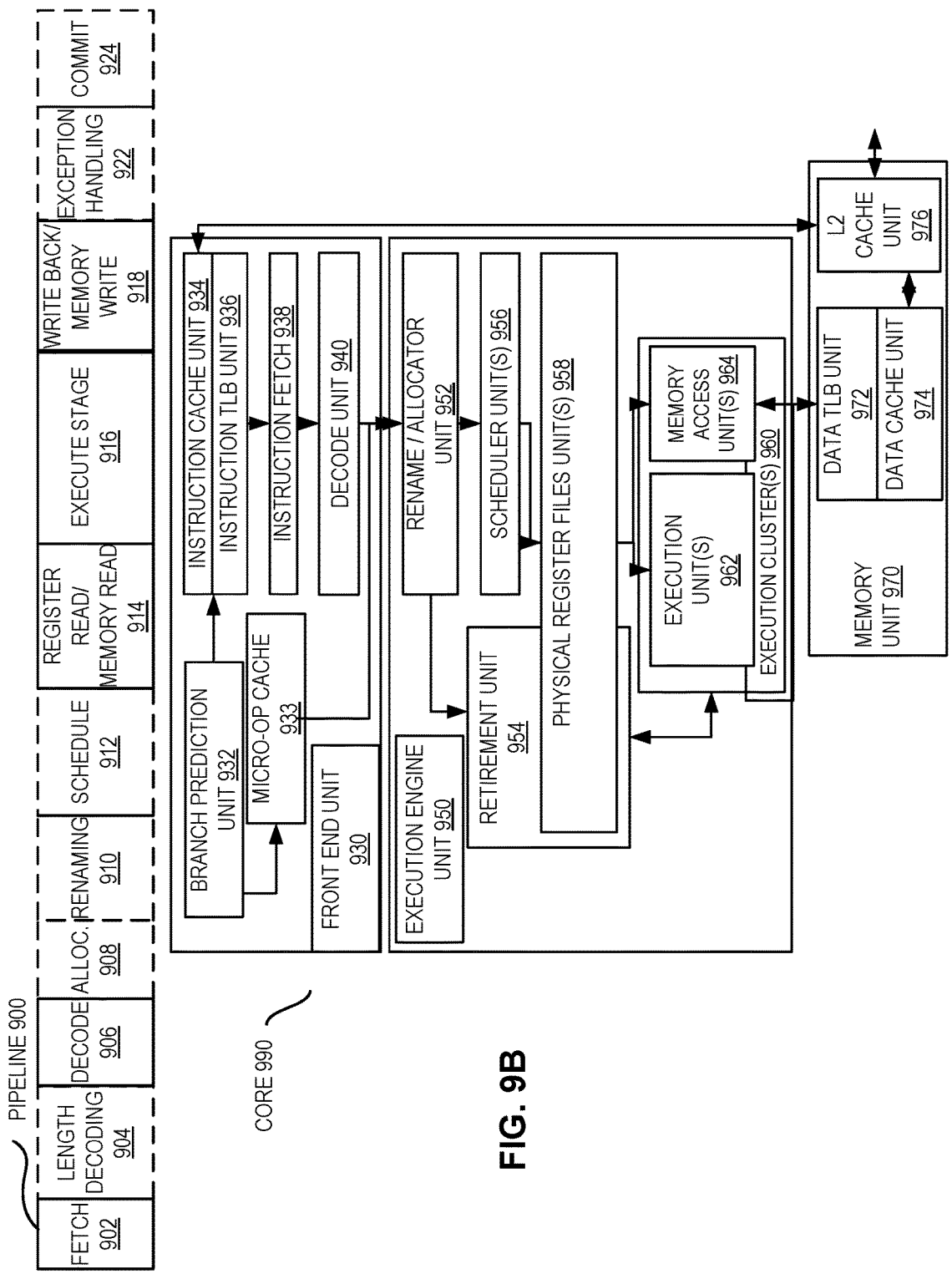
FIG. 9A is a block diagram illustrating both an exemplary in-order pipeline and an exemplary register renaming, out-of-order issue/execution pipeline according to embodiments of the invention.
FIG. 9B is a block diagram illustrating both an exemplary embodiment of an in-order architecture core and an exemplary register renaming, out-of-order issue/execution architecture core to be included in a processor according to embodiments of the invention.

Described herein are systems and methods for using memory tagging for side-channel defense, memory safety, and sandboxing to reduce the likelihood of successful side-channel attacks and other exploits, in accordance with various embodiments. The disclosed system and methods include memory tagging circuitry that is configured to address existing and potential hardware and software architectures security vulnerabilities, according to various embodiments. The memory tagging circuitry may be configured to prevent memory pointers being overwritten, prevent memory pointer manipulation (e.g., by adding values) that cause the pointers to land on a wrong (unauthorized) data object in memory space, access a non-current object in time and increase the granularity of memory tagging to include byte-level tagging in cache. The memory tagging circuitry may also be configured to sandbox untrusted code by tagging portions (e.g., words) of memory to indicate when the tagged portions of memory include contain a protected pointer. By co-locating metadata with the same cacheline as its associated data so that it is immediately available for enforcement, memory tagging circuitry provides security features while enabling CPUs (e.g., CPU 412 in FIG. 4), processor cores (e.g., any of cores 116 in FIG. 1; any of cores 418 in FIG. 4; any of cores 718 in FIG. 7; core 990 in FIG. 9; or any of cores 1002A-N in FIG. 10 or FIG. 14), and processors (e.g., any of processors 116 in FIG. 1, any of processors 710 in FIG. 7; processor 1000 in FIG. 10; any of processors 1110 or 1115 in FIG. 11; any of processors 1270, 1280, or 1215 in FIG. 12 or FIG. 13; or processor 1410 in FIG. 14) to continue using and benefiting from performing speculative operations in a cache coherent manner. By allowing the hardware to automatically hide the metadata on the same cacheline transparently from software, legacy compatibility can be maintained as software may access virtual/linear memory contiguously without needing to ignore or skip over metadata regions, while the hardware may still enforce the metadata policies on the data.

In some embodiments, an apparatus, system, or method provides for memory protection with hidden inline metadata. The hidden inline metadata is implanted within one or more cachelines for a cache. The metadata is hidden at the linear address/virtual address level as memory is seen by software in a contiguous manner, but the metadata is available for the purposes of memory tagging (such as tag compare with a pointer tag value in a linear address), capabilities (such as data structure length, permissions), and/or fine grain memory access control as enforced by the hardware.

In some embodiments, hidden inline metadata may include, but is not limited to, tag storage. In some embodiments, an apparatus, system, or process may operate without defining tag storage architecturally. Hardware is to hide tag metadata, with an identifier to indicate whether metadata is present in a cacheline. In one embodiment a bit (or bits) in a page table entry identifies whether or not a cacheline includes hidden inline metadata.

The use of the hidden inline metadata may provide multiple advantages in the operation of an apparatus, system, or process in comparison with conventional technology to provide metadata, including:

Improved performance with a single cycle required access to data and hidden inline metadata;

Cache efficiency, with no additional metadata being required in the cache area;

Memory efficiency with metadata only being included when required;

Precision with both load and store checks being provided; and

Side channel protection with the parallel metadata being present to avoid speculation in data attacks.

An uncore (uncore referring to functions of a microprocessor that are not within a processor core) memory tagging solution can support sub-cacheline memory tagging and shifting data within multiple split cachelines to detect data buffer overflow, use after free, stack overflow, heap separation, access control, etc. DCD (Data Corruption Detection) provides a core memory tagging solution using table lookups from linear space. However, in uncore memory tagging there may be issues regarding precision (regarding a time required to detect/report errors) and ability to detect both underflow and overflow conditions simultaneously. Further, the latency for uncore configuration of memory tags may be high, requiring non-temporal memory writes or uncached writes to update ECC (Error Correcting Code) memory. Reading the metadata may also be an issue with an uncore solution. For example, DCD provides a core solution for memory tagging, but table lookups via linear mapped memory create latency issues (potentially causing multiple memory accesses to fetch metadata, and associated cache thrashing) and/or require additional caching of tags. Additionally, separating the DCD tables from the memory data requires multiple memory reads, including one read to fetch the data and additional reads to fetch the table metadata (e.g., memory tags). Requiring serialization for the independent memory reads causes performance slowdown, while speculatively proceeding with the data processing without knowledge of the metadata access control policy (e.g. tag match check) may expose side channel vulnerabilities.

Figure 1:
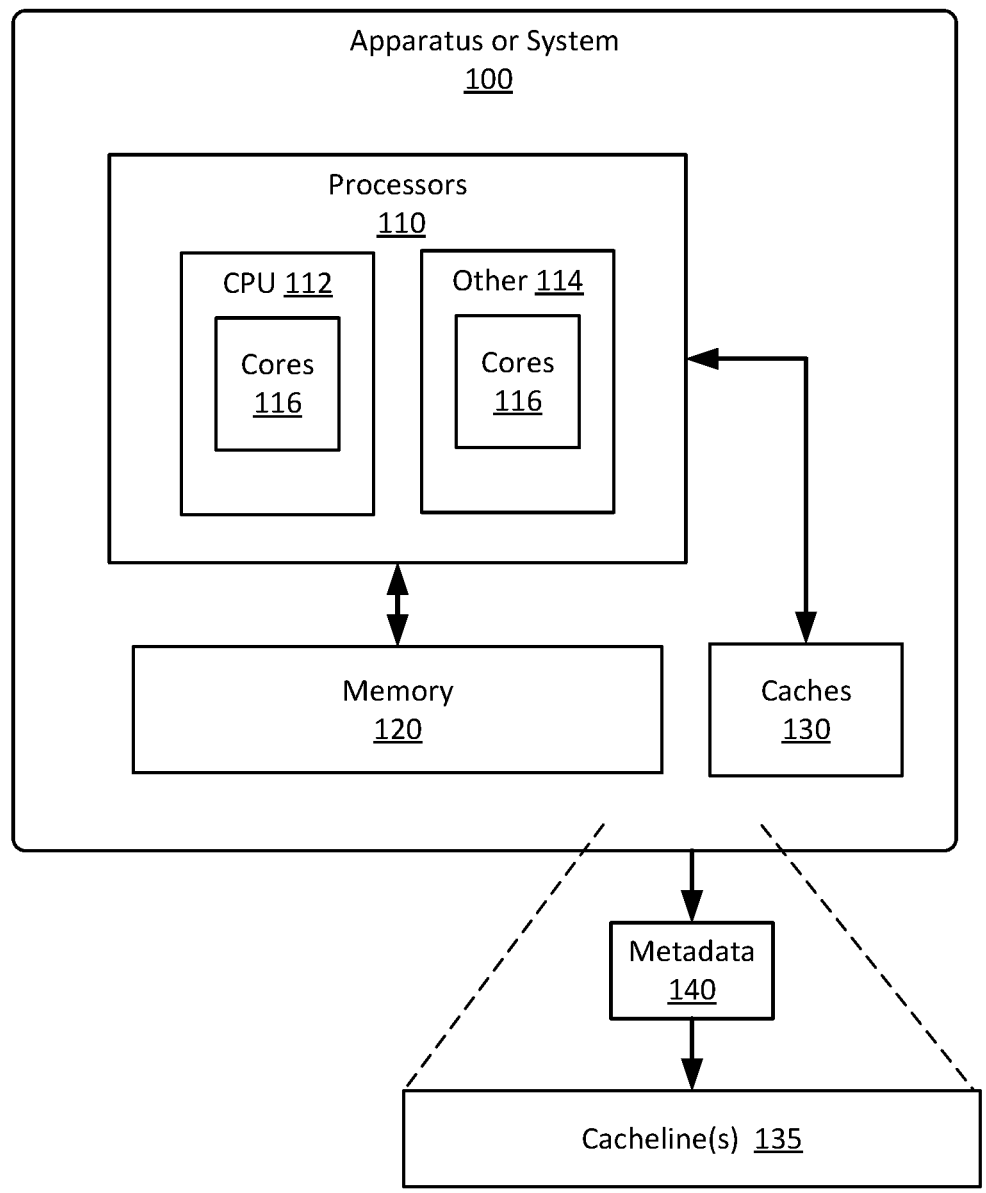
FIG. 1 is an illustration of insertion of metadata into a cacheline, in accordance with at least one embodiment described herein.

FIG. 1 is an illustration of insertion of metadata into a cacheline, in accordance with at least one embodiment described herein. As shown in FIG. 1, an apparatus or system 100 includes one or more processors 110, wherein the one or more processors may include a main processor such as a central processing unit (CPU) 112 or other similar unit, and one or more other processors 114. The one or more other processors 114 may include, but are not limited to, one or more graphics processing units (GPUs) or other types of processors (AI (Artificial Intelligence) accelerator, FPGA (Field Programmable Gate Array), etc.). Each of the one or more processors 110 may include multiple processor cores 116. The CPU 112 may include elements illustrated for CPU 412 in FIG. 4.

The apparatus or system 100 includes a memory 120 for the storage of data, and one or more caches 130 for the storage of data to increase speed of operation of the processor cores 116 of the one or more processors 110. For example, the one or more processors 110 may store data elements in any of the one or more caches 130 to provide for increased efficiency and performance. The caches 130 may include any level of cache, such as L1, L2, and/or L3 caches, and may be located within varying locations within the apparatus or system 100, including within the one or more processors 110. The apparatus or system 100 includes other elements not illustrated in FIG. 1, such as elements illustrated for processor-based device 700 in FIG. 7.

In some embodiments, the one or more processors 110 of the apparatus or system 100 are to insert metadata 140 into one or more cachelines 135 for storage and transfer of data between the memory 120 and the caches 130. In some embodiments, the metadata 140 is inserted as hidden inline metadata within the one or more cachelines 135. The metadata 140 is hidden at the linear address/virtual address level as memory is seen by software, but the metadata 140 is present and visible to the physical hardware and privileged software for the purposes such as memory tagging (such as tag compare with pointer tag value in linear address), capabilities (such as data structure length and permissions), and/or fine grain memory access control.

In some embodiments, an apparatus, system, or process is to provide efficient memory tagging in operation in which metadata lookup, such as lookup of metadata 140, is performed in the same cacheline and same cycle as the data accesses of the cacheline 135 that the metadata 140 is associated. This allows memory tags to be checked against a memory pointer tag (linear address tag) by a processor pipeline concurrently (at a same or overlapping time) with the data access occurring before the processor pipeline removes the tag metadata prior to, for example, a GPR (General Purpose Register) load. Stated in another way, access to the one or more memory tags of the first cacheline occurs in a same clock cycle as data access to the cacheline. In some embodiments, the implementation of hidden inline metadata for one or more cachelines enables memory tagging to detect use-after-free vulnerabilities (referring to vulnerabilities to attempts to access memory after it has been freed) or overflow/underflow conditions, and to provide other forms of access control at fine granularities. An embodiment offers a highest performance solution wherein data need not be acted upon speculatively without knowledge of the metadata policy for the data.

In some embodiments, implanting metadata within the cacheline 135 itself may be utilized to provide efficient lookup of the metadata 140 associated with the data on the same cacheline 135, allowing optimal memory tagging solutions, machine capability, and fine-grain memory access control. In some embodiments, a memory tagging solution may be extended to all of memory 120, and is not limited to small object allocations that fit within a cacheline. In some embodiments, a processor is to automatically skip over the metadata regions of memory as it is loading or storing linearly addressed data.

Figure 2:
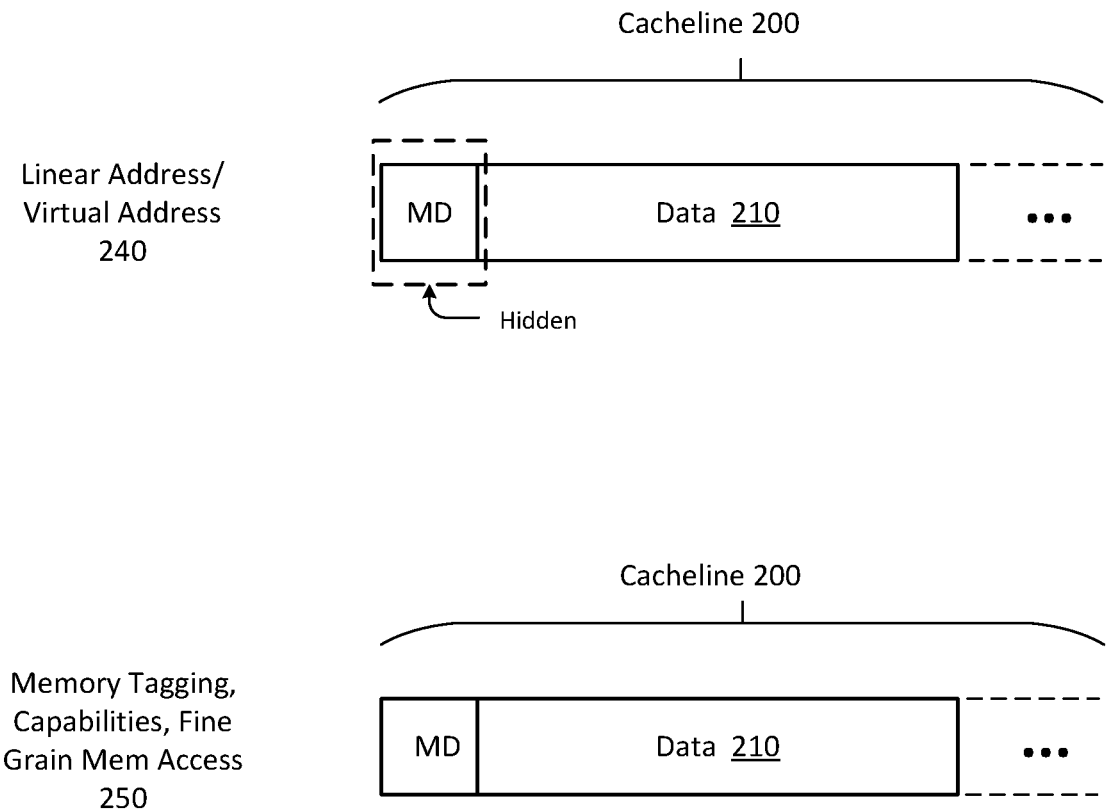
FIG. 2 is an illustration of insertion of metadata into a cacheline, in accordance with at least one embodiment described herein.

FIG. 2 is an illustration of insertion of metadata into a cacheline, in accordance with at least one embodiment described herein. As shown in FIG. 2, a cacheline 200 includes a data portion 210 and a metadata portion 220. The metadata portion 220 is hidden for purposes of contiguous linear address/virtual address operations 240, but may be conditionally visible and available to the physical hardware and privileged software for operations such as memory tagging, capabilities, and fine grain memory control 250.

In some embodiments, a system may include the following processor instructions:

StoreMetadata([in]Address,[in]tag) instruction: A new processor instruction called StoreMetadata to be called by the memory allocator/free (or other authorized software routine) to store/set a tag value associated with a particular memory location (linear address). The StoreMetadata is thus similar to a memory poke. The software setting a tag is required to have write access to the linear address associated with the tag to set the tag as determined by protected memory (e.g., page table permissions & meta bit). Thus, even though the metadata is hidden, the StoreMetadata instruction can update the hidden metadata corresponding to the addressed data location in memory.

LoadMetadata([in]address, [out]tag) instruction: A new processor instruction called LoadMetadata to be called by memory allocator (or other authorized software routine) to retrieve a tag value associated with a particular memory location (address). LoadMetadata is similar to a memory peek instruction. LoadMetadata may be utilized in connection with debugging and other operations, allowing software to retrieve the hidden metadata stored in memory.

In some embodiments, memory tagging allows software to select the tag bits within a linear address by setting non-canonical bits to the tag value (e.g., utilizing a C or C++ pointer). The linear address tags are then compared with the metadata tags stored in the hidden memory to determine if the memory access is authorized. For example, to detect use-after-free exploits, a memory allocation routine (e.g., malloc) is to set the authorized memory tag(s) (StoreMetadata) for the allocated memory location(s), and then provide software with a pointer value containing the matching tag value (color) addressing the allocated memory buffer. When the software executes and causes the allocated memory to be loaded (e.g., into a processor register or GPR) or stored to memory, the processor will first compare the tag value in the pointer (non-canonical bits of the linear address) with the metadata tag value stored in hidden memory for the specified memory location (linear address). Because the metadata tags are co-located with the data (hidden from software), no additional memory lookups or caching is required to fetch and compare the stored tag values. In this manner, an efficient solution for memory tagging and access control is provided. Meanwhile, OS kernel/VMM (Virtual Machine Monitor) is provided to access memory without the metadata page table bit set in its memory mapping to page-in/page-out memory pages including the tag metadata (metadata physical memory is larger than in LA space). Finally, an overflow memory region is used to store both extra data and metadata that goes beyond a physical page size.

Figure 3A:
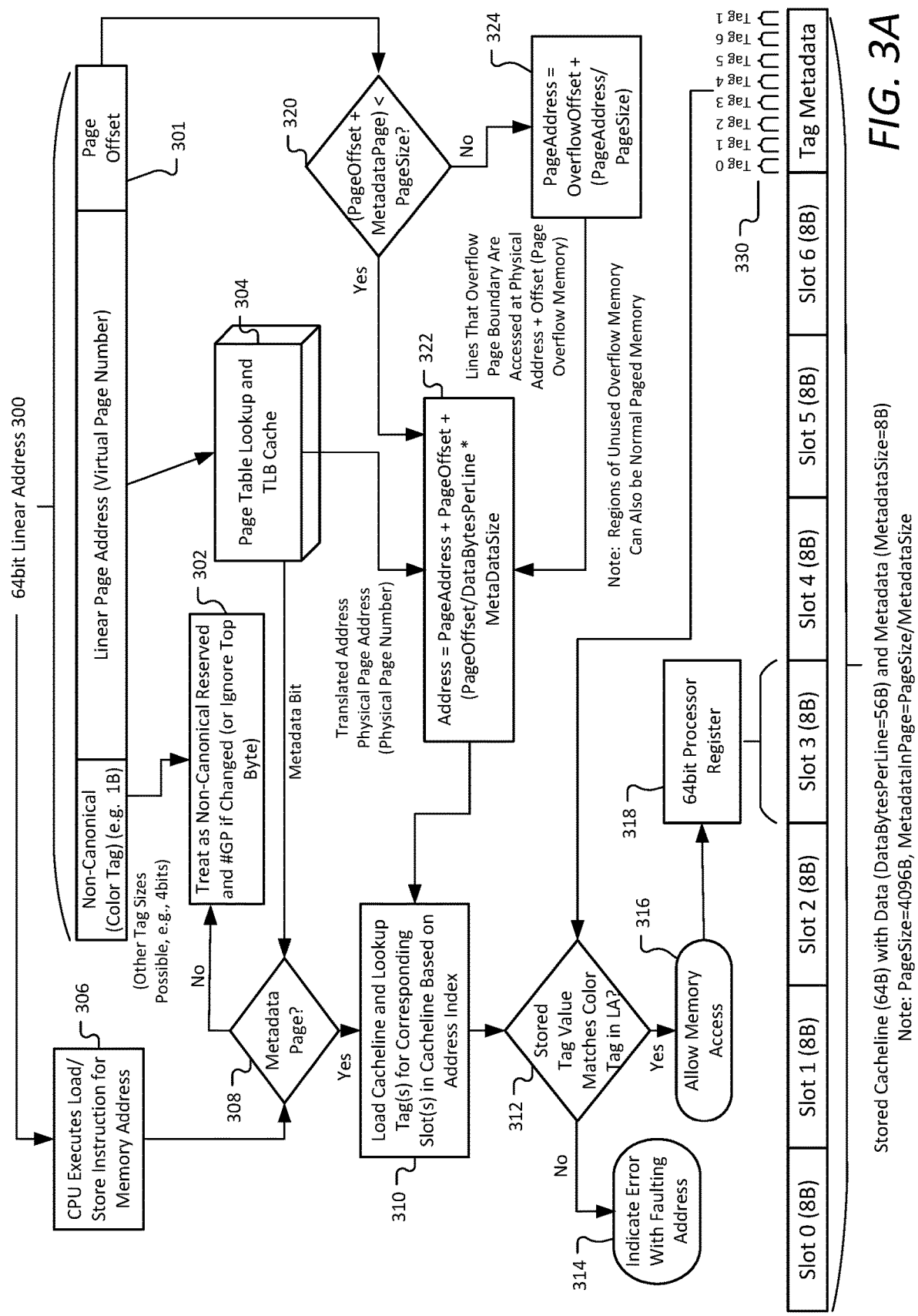
FIG. 3A is a flowchart to illustrate a process for handling data with hidden inline metadata, in accordance with at least one embodiment described herein.

FIG. 3A is a flowchart to illustrate a process for handling data with hidden inline metadata, in accordance with at least one embodiment described herein. As illustrated in FIG. 3, for a 64 bit linear address (as an example) there may be a linear address (indicating a location) together with non-canonical value bits, such as one byte in an example, as a color tag. As illustrated, the linear address is utilized for a page table lookup and TLB (Translation Lookaside Buffer) cache 304. If the non-canonical/color tag portion is treated as non-canonical reserved value, then a general protection exception (#GP) occurs if the value is changed (or, alternatively, the top byte may be ignored) 302. Otherwise, the linear address tag value may be compared with the metadata value stored in hidden memory for the associated address.

In an operation, a CPU (or other processor) is to execute a load or store an instruction for the memory address (the linear address/location portion) 306. If the memory address is not a metadata page 308, the data is treated as a non-canonical reserve value 302. In some embodiments, a determination whether the memory address is a metadata page may be determined by checking an identifier in a memory or storage, including, for example, checking whether one or more bits in a page table entry (which may be referred to as a metadata bit) are set to indicate the presence of metadata in a cacheline for the cachelines corresponding to the associated page. If the memory address is a metadata page, then the cacheline and lookup tags(s) for corresponding slots in the cacheline are loaded based on address index 310. There is then a determination whether the stored tag value (of the stored cacheline with tag metadata 330) matches the color tag value in the linear address 312. If not, then an error is indicated with the faulting address 314. Note, different embodiment may use different metadata and slot sizes. For example, slot sizes could be four bytes and each metadata could be four bits, with four metadata bits corresponding to each of these 32-bit slots. The locations in the cacheline and the format of metadata may vary by embodiment; a few examples are shown in FIG. 6.

If there is a match 312, then memory access is allowed 316, illustrated as access to a 64 bit processor register 318, and the processor pipeline merging data slots for register load or memory store (shown as sixty bytes). The actual data location may be calculated based on the page offset 301, for example Address=PageAddress+PageOffset+(PageOffset/DataBytesPerLine)*MetaDataSize. This is illustrated in FIG. 3A, wherein if (PageOffset+MetadataPage) is less than PageSize, then Address=PageAddress+PageOffset+(PageOffset/DataBytesPerLine)*MetaDataSize, However, otherwise there is an overflow condition and lines that overflow are accessed at PhysicalAddress plus Offset, and thus PageAddress=OverflowOffset+(PageAddress/PageSize) 324.

If a software bug/vulnerability causes a freed pointer to be used to access newly allocated memory for another part of the program, when the newly stored tag values don't match the tag value in the freed pointer, then the processor will signal an error/exception/fault. Similarly, bounds checking is implicit by using the same tag value for all entries in the same array and then changing the tag value for adjacent memory locations that belong to other data structures.

In some embodiments, with a mechanism as illustrated in FIG. 3A, any granularity of memory tagging is possible, and may be enabled on a page by page basis. In the above illustration one byte of tag data is utilized to color fifteen bytes of data (with approximately six percent memory overhead for metadata). Similarly, four-bit tags could color eight bytes of data, etc., depending on the size and placement of the tag values. The processor pipeline will check and then remove/skip-over tag values from memory upon loading data into processor registers or buffers. Similarly, the processor pipeline will check the tags when storing data, skipping over the stored tags to complete the data store around the metadata data regions.

Embodiments are not limited to the specific process flow and operations illustrated in FIG. 3A. Varying embodiments are possible to process the data in connection with hidden inline metadata. Further, hidden inline metadata is not limited to the storage of tags as illustrated in FIG. 3A.

Figure 3B:
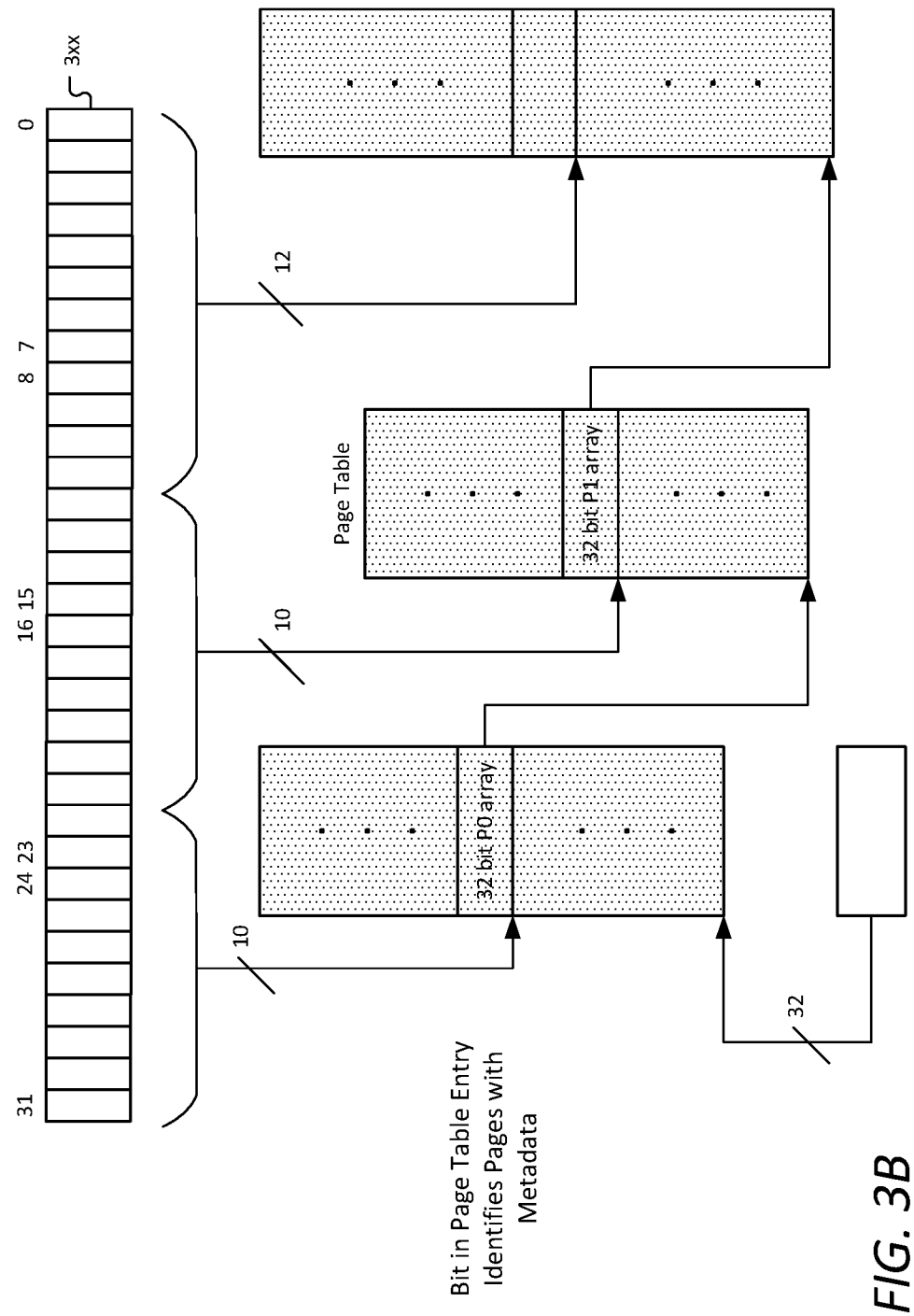
FIG. 3B is an illustration of memory paging structure for an apparatus or system including a hidden inline metadata bit in a page table entry, in accordance with at least one embodiment described herein.

FIG. 3B is an illustration of memory paging structure for an apparatus or system including a hidden inline metadata bit within a page table entry, in accordance with at least one embodiment described herein.

In some embodiments, as indicated in FIG. 3B, a bit in the page table entry identifies pages that contain hidden inline metadata, such as the example of a size with 128B larger than 4 KB. The kernel will operate with page in/page out 4 KB+128B, thus including the data and hidden inline metadata. If there is an overflow, for example, (PageOffset+ MetadataInPage)<PageSize, an operation is to fetch the next line in the page from the overflow memory region based on an offset. For example, PageAddress=OverflowOffset+ (PageAddress/PageSize).

Figure 3C:
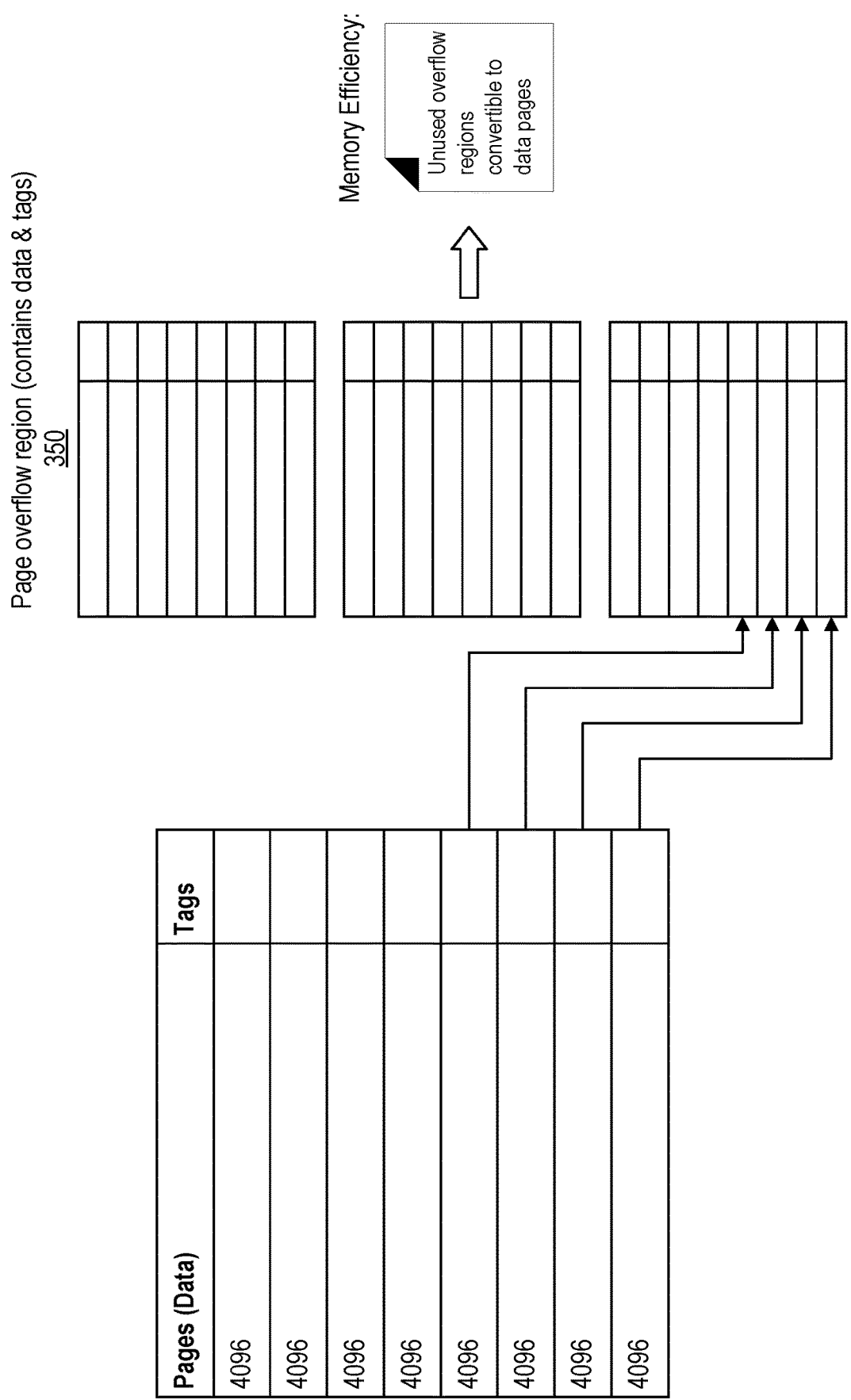
FIG. 3C is an illustration of page overflow in memory for an apparatus or system including hidden inline metadata, in accordance with at least one embodiment described herein.

FIG. 3C is an illustration of page overflow in memory for an apparatus or system including hidden inline metadata, in accordance with at least one embodiment described herein. An overflow region 350 is sequestered from main memory to hold the remainder of pages which are bloated due to the presence of inline metadata. When the processor reaches the end of a page including hidden inline metadata, the processor retrieves the remainder of the page and its metadata from a slot associated with the physical page number (PPN) in the overflow region 350.

Figure 3D:
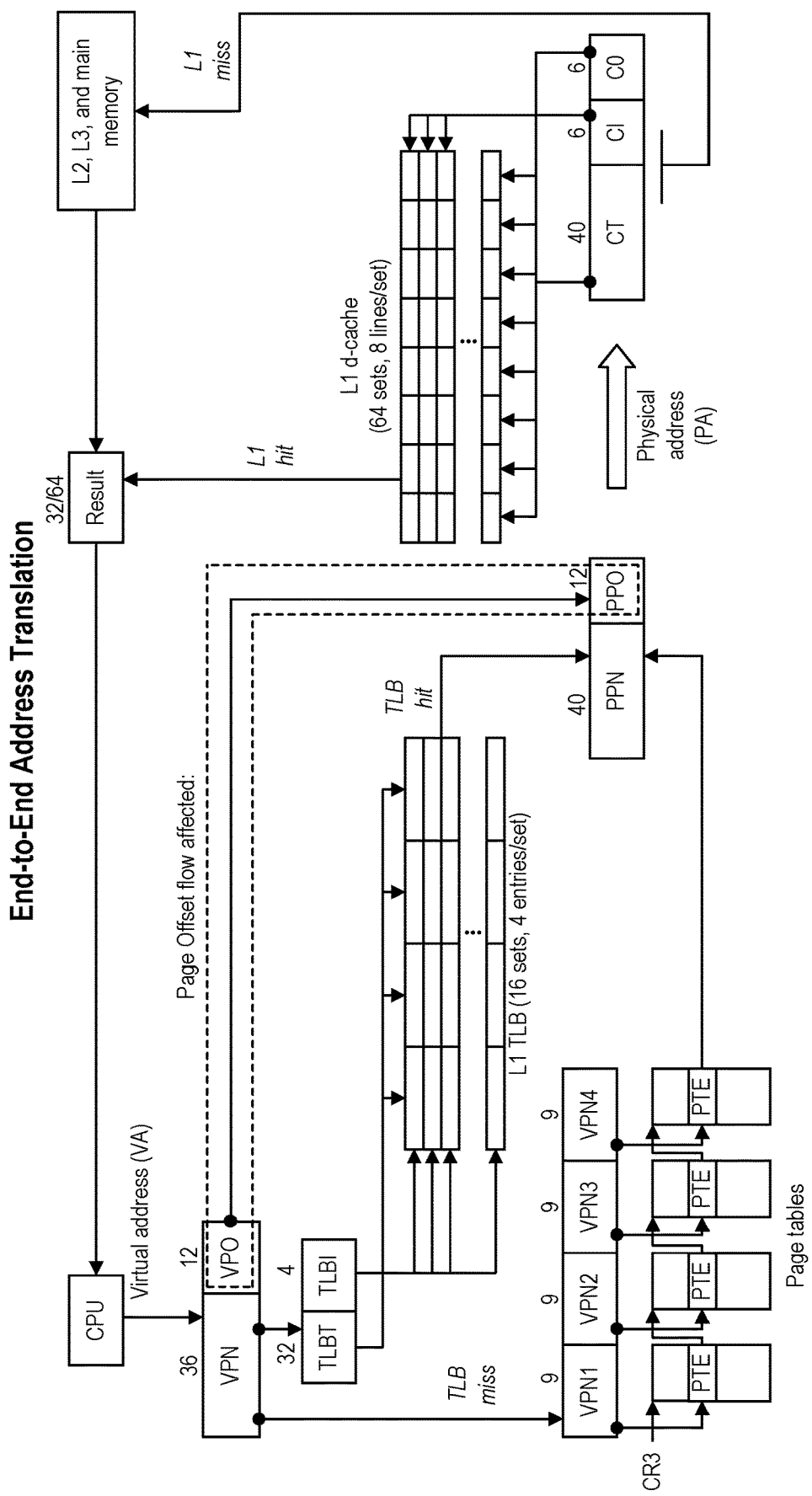
FIG. 3D is an illustration of end-to-end address translation in an apparatus or system including hidden inline metadata, in accordance with at least one embodiment described herein.

FIG. 3D is an illustration of end-to-end address translation in an apparatus or system including hidden inline metadata, in accordance with at least one embodiment described herein.

Figure 4:
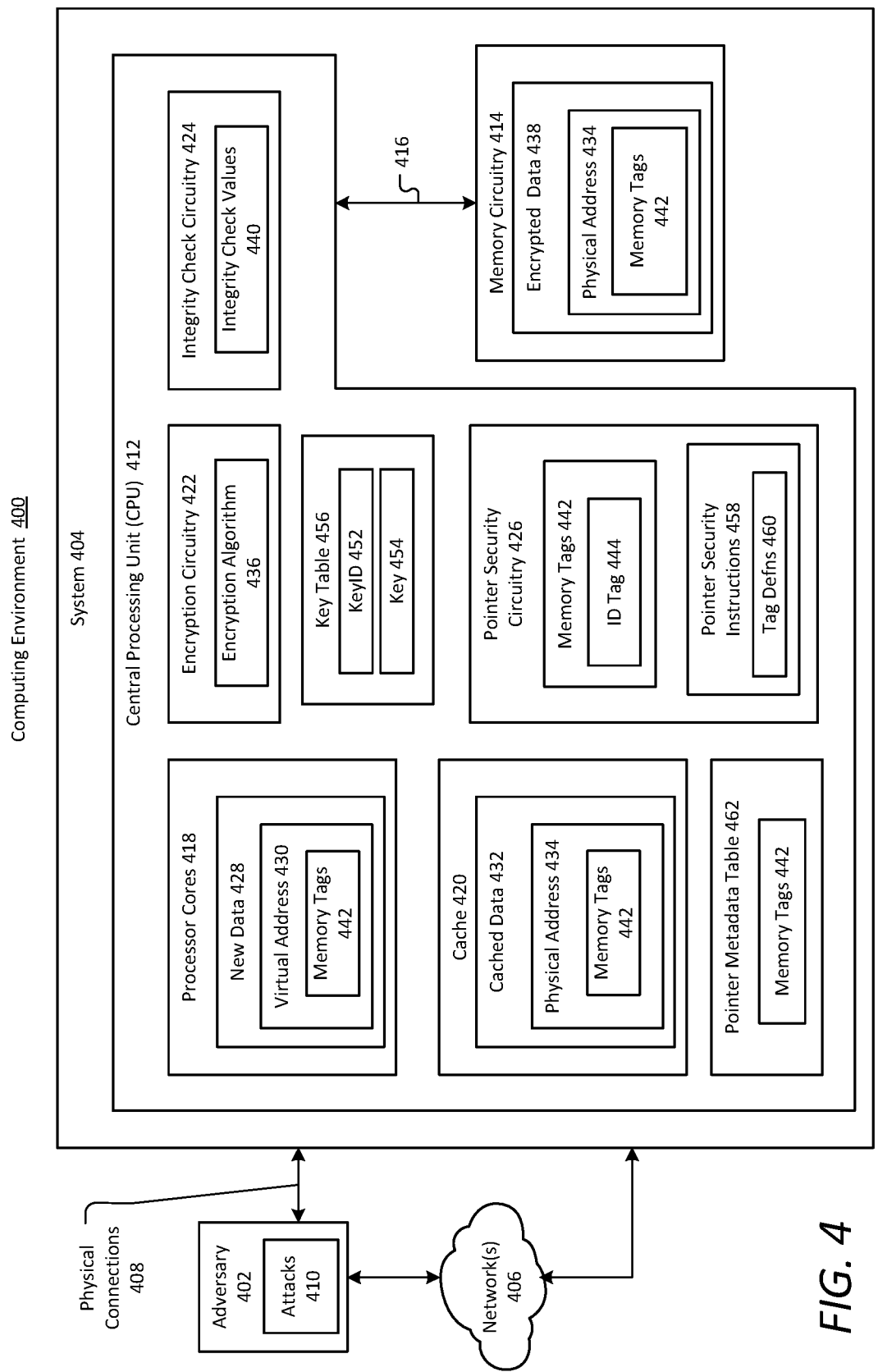
FIG. 4 is a block diagram of a system that reduces the likelihood of successful side-channel attacks within a central processing unit (CPU) by providing address-based security features for memory within the CPU, in accordance with at least one embodiment described herein.

FIG. 4 is a block diagram of a computing environment 400 that reduces the likelihood of successful side-channel attacks within a central processing unit (CPU) by providing address-based security features for memory within the CPU, in accordance with at least one embodiment described herein. The system 404 reduces the likelihood of successful side-channel attacks and memory exploits, while concurrently enabling the CPU to perform and benefit from performing speculative operations, according to an embodiment. The computing environment 400 may include an adversary 402 coupled to a system 404 through one or more networks 406 or one or more physical connections 408, according to an embodiment. The adversary 402 may perform one or more memory exploits or side-channel attacks 410 on the system 404 through the networks 406 and/or through the physical connections 408. The system 404 may include one or more of a variety of computing devices, including, but not limited to, a personal computer, a server, a laptop, a tablet, a phablet, a smartphone, a motherboard with a chipset, or some other computing device, according to various embodiments. The system 404 is configured to protect a CPU 412 against side-channel attacks using a variety of address-based security features that enable the CPU to safely operate while performing speculative operations.

The adversary 402 may be a computing system, a person, or a combination of the computing system and a person, which may attempt one or more memory exploits or sides channel attacks on and against the system 404. The adversary 402 may use one or more networks 406 to execute the exploits and side-channel attacks 410. The adversary 402 may also use one or more physical connections 408, such as a memory interpose, memory probes, or the like, to read, modify, and/or write to one or more memory addresses within the system 404 in order to physically attack the system 404. Some of the attacks 410 may include attempting to override a pointer, attempting to manipulate up pointer (e.g., add they value to pointer to cause the pointer to point to an unintended object or move beyond the object's bounds), use a freed pointer to access a new object, and the like.

The system 404 is configured to provide a variety of memory-based security features to protect against the attacks 410, according to an embodiment. The system 404 includes base central processing unit (CPU) 412 which is coupled to memory circuitry 414 through one or more communications channels 416, according to an embodiment. The CPU 412 includes processor cores 418, cache 420, encryption circuitry 422, and integrity check circuitry 424, according to an embodiment. The CPU 412 also includes pointer security circuitry 426 that is configured to expand memory tag capabilities, reduce or prevent pointer override attacks, reduce or prevent pointer manipulation, prevent the reuse of freed pointers and enable byte-granularity memory safety for the CPU 412, according to an embodiment.

The CPU 412 may include any number and/or combination of currently available and/or future developed single- or multi-core central processing units. In embodiments, the CPU 412 may include a general-purpose processor, such as a Core® i3, i5, i7, 2 Duo and Quad, Xeon®, Ltanium®, Atom®, or Quark® microprocessor, available from Intel® (Intel Corporation, Santa Clara, CA). Alternatively, the CPU 412 may include one or more processors from another manufacturer or supplier, such as Advanced Micro Devices (AMD®, Inc.), ARM Holdings® Ltd, MIPS®, etc. The CPU 412 may include a special-purpose processor, such as, for example, a network or communication processor, compression engine, graphics processor, co-processor, embedded processor, or the like. The CPU 412 may be implemented as a single semiconductor package or as a combination of stacked or otherwise interconnected semiconductor packages and/or dies. The CPU 412 may be a part of and/or may be implemented on one or more substrates using any of a number of process technologies, such as, for example, CMOS (Complementary Metal Oxide Semiconductor), BiCMOS (Bipolar CMOS) or NMOS (N-type Metal Oxide Semiconductor).

The memory circuitry 414 represents one or more of a variety of types of memory that may be used in the system 404, according to an embodiment. The memory circuitry 414 may be volatile memory, may be non-volatile memory, or may be a combination of volatile memory and non-volatile memory, according to an embodiment. The volatile memory may include various types of random-access memory (RAM). The non-volatile memory may include NAND memory, 3D crosspoint (3DXP), phase-change memory (PCM), hard disk drives, and the like, according to an embodiment.

The CPU 412 uses a number of components to move data back and forth between the CPU 412 and the memory circuitry 414, according to an embodiment. For example, while operating one or more software programs or while executing various instructions, the processor cores 418 may generate new data 428. The processor cores 418 may use a virtual address (a.k.a. Linear Address) 430 the new data 428 to write the new data 428 to the cache 420 or to the memory circuitry 414 via a translated physical address 434. The new data 428 may be saved in the cache 420 as cache data 432, or may be added to existing cached data 432, according to an embodiment. The cached data 432 may have a physical address 434 including KeyIDs, tags or additional metadata 442. The CPU 412 may be configured to use the encryption circuitry 422 and an encryption algorithm 436 to encrypt the new data 428 and/or the cached data 432 prior to saving the new data 428 and/or the cached data 432 to the memory circuitry 414, as encrypted data 438. The CPU 412 may also use the integrity check circuitry 424 to generate integrity check values (or Message Authentication Codes/MAC) 440 that are based on the new data 428, the translated virtual address 430, the tags 442 for selecting the cryptographic MAC Key 454, and/or the physical address 434, according to an embodiment. The CPU 412 writes the integrity check values 440 to the memory circuitry 414, to enable corruption detection for the encrypted data 438 (caused, for example, by decrypting the data with using the wrong key).

The CPU 412 may use the pointer security circuitry 426 to provide security for the data within the system 404. The pointer security circuitry 426 may be configured to detect when the virtual address 430 and/or the corresponding translated physical address 434 is being overridden, detect when the virtual address 430 and/or the physical address 434 has been manipulated, detect when the virtual address 430 and/or the physical address 434 has been used after being freed, provide byte-granularity memory safety through bounds checking, and provide definitions for use of memory tags, according to various embodiments disclosed herein. FIG. 4 illustrates an example hardware configuration that may be used to support the security features provided by the pointer security circuitry 426. Various different memory tag configurations that may be identified, defined, and/or applied by the pointer security circuitry 426 to secure the system 404 from the attacks 410, according to various embodiments.

When the processor cores 418 assign (e.g., by executing a software program) the virtual address 430 to the new data 428, the pointer security circuitry 426 may define, insert, or identify one or more memory tags 442 in the virtual address 430, to associate with the new data 428 to reduce the likelihood of a successful attack.

The virtual address 430 for the new data 428 may include the identification tag 444 to provide security for the new data 428. The identification tag 444 may be colloquially referred to as a color, a memory color, a tag color, and the like. The identification tag 444 may include one or more bits of the virtual address 430. The pointer security circuitry 426 may be configured to define where within the virtual address 430 the identification tag 444 resides or is defined. For example, the pointer security circuitry 426 may define the identification tag 444 as the eight most significant bits in the virtual address 430. The identification tag 444 may be defined as, for example, bits 56-62 (i.e., seven bits) of bits 0-63 of the virtual address 430, assuming, as an example, that the length of the virtual address 430 is sixty-four bits.

The physical address 434 for the new data 428 may include the encryption tag 446 to provide security for the new data 428. The encryption tag 446 may include one or more bits of the physical address 434. The pointer security circuitry 426 may be configured to define where within the physical address 434 the encryption tag 446 resides or is defined. For example, the pointer security circuitry 426 may define the encryption tag 446 as the three most significant bits in the physical address 434. The encryption tag 446 may be defined as, for example, bits 59-62 (i.e., three bits) of bits 0-63 of the physical address 434, assuming, as an example, that the length of the physical address 434 is sixty-four bits. The physical address may also be smaller than the virtual address, such as fifty-six bits in size. The encryption tag 446 may be a representation of a key ID 452 that is used to look up the encryption key 454 within a key table 456, by the encryption circuitry 422, according to an embodiment. The encryption tag 446 may also or alternatively be identified using other techniques, e.g., may be defined within one or more bits in the physical address 434. The encryption tag may be assigned by the processor based on which VM is executing on a core or thread in a multi-tenant system, or may be determined by the translation of a virtual address into a physical address via the page tables or extended page tables (EPTs) utilized by a memory management unit to populate virtual to physical address translations via translation lookaside buffers (TLB).

The pointer security circuitry 426 may also include pointer security instructions 458 that at least partially provide tag definitions 460. The pointer security instructions 458 may include a number of instructions or operations that may be used by the pointer security circuitry 426 or the CPU 412 to add a pointer in accordance with the tag definitions 560.

Figure 5:
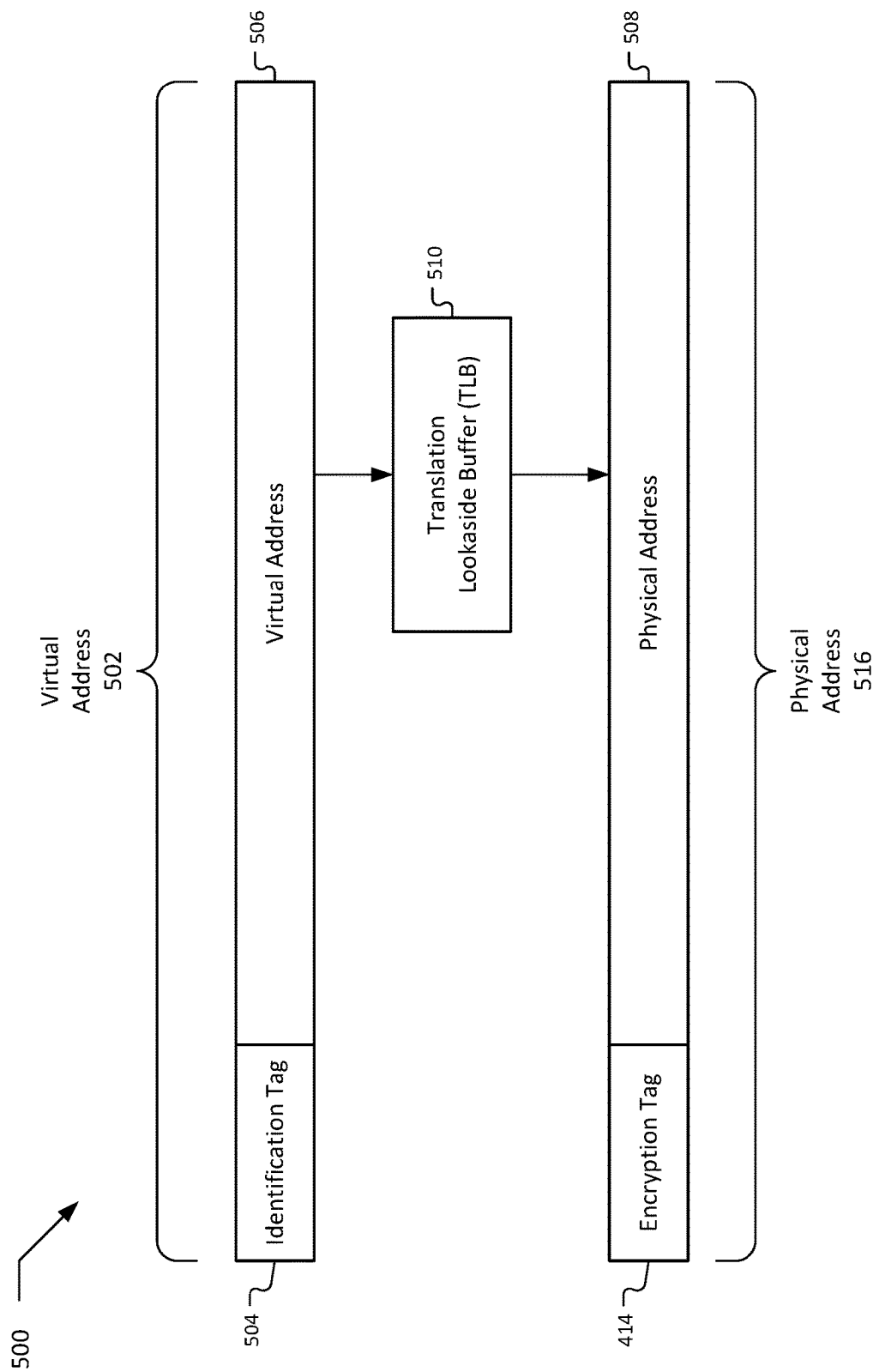
FIG. 5 illustrates a memory address translation diagram of an implementation of memory tags that may be used to secure memory address pointers against attacks, in accordance with at least one embodiment described herein.

FIG. 5 illustrates a memory address translation diagram 500 of an implementation of memory tags that may be used to secure memory address pointers against attacks, in accordance with at least one embodiment described herein. The memory address translation diagram 500 illustrates a virtual address 502 that includes an identification tag 504 that occupies one or more otherwise unused address bits (e.g., non-canonical address bits) and a virtual address 506 for locating data that occupies a subset of the virtual address 502, according to an embodiment. The virtual address 502 may be 64 bits. The identification tag 504 may occupy one or more most significant bits, or other bits within the virtual address 502. The virtual address 506 is translated into a physical address 508 through a translation lookaside buffer (TLB) 510, according to an embodiment. An encryption tag 514 may be appended to the physical address 508 to identify one or more encryption keys through the key table 456 (shown in FIG. 4), according to an embodiment. The processor may select the encryption tag based on what Virtual Machine (VM) or other context is currently executing on a processor thread, or else determine the encryption tag from a page table walk and the resulting TLB.

Employing the memory tag architecture that is illustrated in the memory address translation diagram 500, within the virtual address 502 and the physical address 516, may enable the system 404 and/or the central processing unit 412 (shown in FIG. 4) to increase the size of identification tags 504 to increase the difficulty of an adversary in guessing which memory tag (e.g., identification tag 504 and/or encryption tag 514) that is associated with a particular memory address pointer and/or a particular object, according to an embodiment. Guessing the wrong tag results in faults/exceptions that prevents data disclosure from side-channel analysis as speculative execution in an embodiment.

In some embodiments, memory tags are used to secure memory address pointers against attacks. In an operation, a CPU executes a load/store instruction for a virtual memory address that includes the identification tag. Objects within a cacheline may rely on metadata tags also embedded in the same cacheline to determine if the correct identification tag in the virtual address was used to access the corresponding object.

The process further provides for loading a cacheline and looking up memory tags for corresponding slots in the cacheline, based on an address index (e.g., the least significant virtual address bits) and the data size (indicating the number of tags that need to be checked for the memory access), according to an embodiment. This may be performed after execution of the load/store instruction, speculatively before such operation, or concurrently with such operation, according to an embodiment. In all cases, the tag metadata is available to the processor residing on the same cacheline, and, thus, does not require a separate memory load and cache line fill.

The metadata tags in the cacheline are compared with the identification tag (e.g., "color" tags) in the virtual address, according to an embodiment. If the tags do not match (e.g., are not equal), there is an indication that an error has occurred, according to an embodiment. If the tags match, access to the memory address associated with the loaded cacheline is allowed, according to an embodiment. Notably, the hidden metadata allows the object data and the corresponding metadata tags to occupy the same cacheline allowing the processor to immediately access the tag data and make an access control decision. Contrast this to speculation which may speculatively proceed with the data access while waiting for separate memory loads of metadata tags to complete, resulting in either side-channels due to speculation or reduced performance while the processor waits for the separate metadata load to complete.

In some embodiments, a stored cacheline is loaded with objects that may comprise a number of slots, which are subsets of the cacheline. One of the slots of the stored cacheline may include tag metadata, according to an embodiment. The tag metadata may include a tag (e.g., a one-byte identification tag) for each of the slots of the stored cacheline, according to an embodiment. The tag metadata provides sub-cacheline granularity to assign memory tags with memory address pointers or with objects, to reduce the likelihood of successful attacks.

Memory tags and tag metadata of various sizes, positions and formats may be used to provide memory tagging security with sub-cacheline granularity, according to an embodiment. The stored cacheline includes a slot for tag metadata that is associated with seven slots, according to an embodiment. The slots may include an additional byte or bits of metadata that may be used to support additional memory tagging functionality, according to an embodiment. There is an extra byte tag for the first slot, that can be used to access control the first slot containing the eight bytes of metadata (tags), for example, limiting access to the memory allocation routines that know the correct identification tag to access the metadata slot. Virtual addresses corresponding to the first slot may be binary bx . . . x000xxx, second slot bx . . . x00lxxx, third bx . . . x0IOxxx, fourth bx . . . x0llxxx, etc. In other words, those three address bits third from the least significant address bit determine which metadata tag to use based on which slot(s) is being accessed by the memory reference. The extent of the slots that a data access comprises is determined by the instruction or operation being executed by the processor. For example, moving contents from memory to a 64 bit general purpose register in the processor may comprise one eight-byte slot, requiring the checking of the one corresponding metadata tag, whereas loading a 128 bit XMM register may require checking the tags corresponding two contiguous slots occupied by the 128 bit SSE data in memory.

Figure 6A:
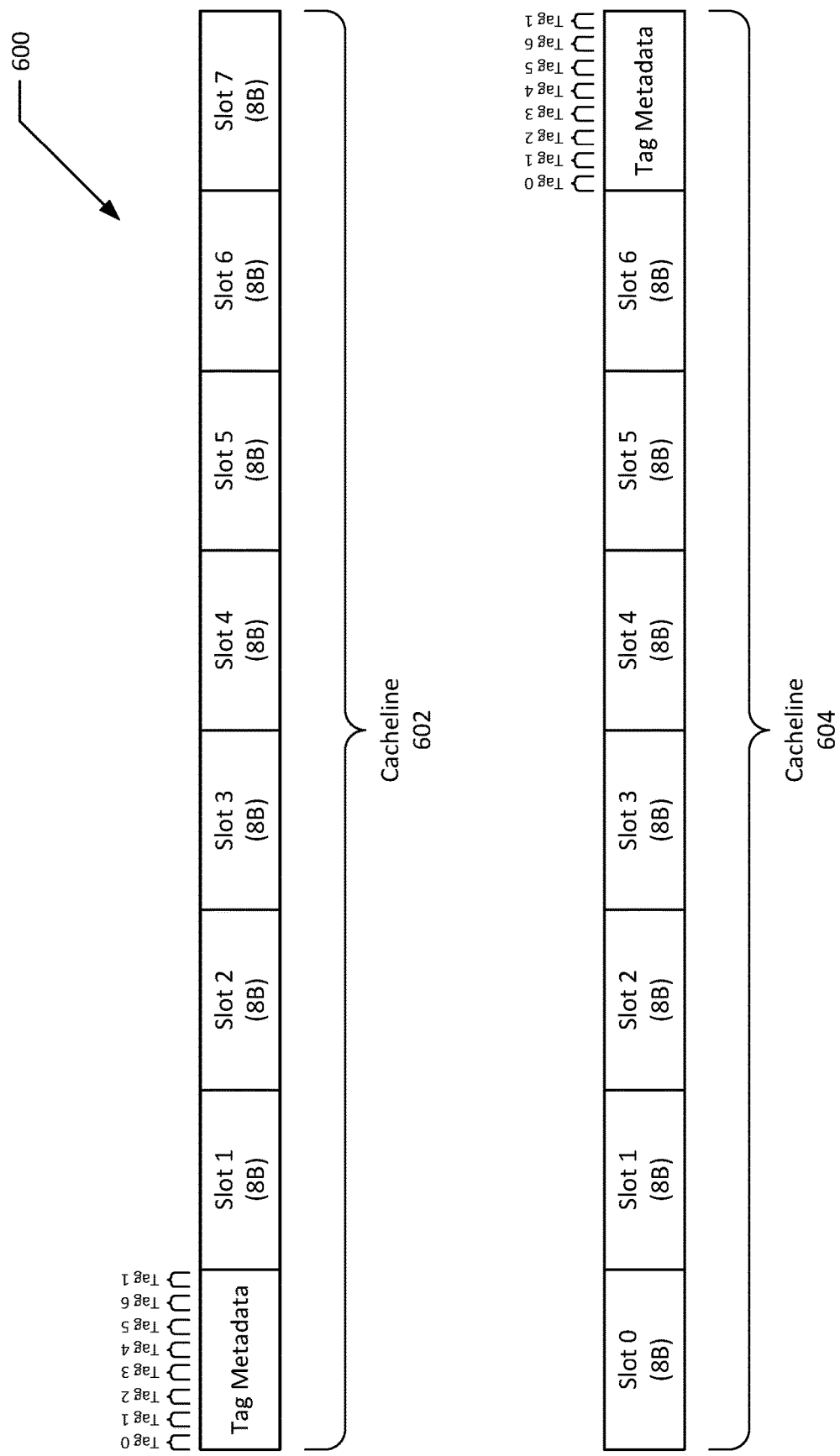
FIG. 6A illustrates a block diagram of different tag metadata configurations for cachelines, in accordance with at least one embodiment described herein.

FIG. 6A illustrates a block diagram 600 of different tag metadata configurations for cachelines, in accordance with at least one embodiment described herein. The block diagram 600 includes a first cacheline 602 and a second cacheline 604. In one implementation of tag metadata in cachelines, a cacheline such as the first cacheline 602 is configured to store a tag metadata in the most significant bits of the cacheline and a cacheline such as the second cacheline 604 is configured to store tag metadata in the least significant bits of the cacheline. Other slots of the cachelines may be used to store tag metadata, according to various embodiments. This format for hidden metadata allows small objects to cross cacheline boundaries in a contiguous fashion, thus allowing incrementing pointers (virtual addresses) to access the full extent of objects that may be larger than a single cacheline. For example, arrays in C or C++ languages are accessed by incrementing the array pointer (virtual address) in a contiguous fashion, allowing the hidden tag metadata to be verified against the virtual address identification tag for each slot comprising the array.

Software, such as glibc memory allocator library, is responsible for assigning identification tags and initializing memory. For example, when memory is first allocated via the malloc function for a certain size, the malloc function will determine the size. It will then return the virtual address with this identification tag to the caller.

The malloc routine will identify a freed block of memory, set the metadata tags to a value corresponding to the pointer's virtual address identification tag returning this pointer to the caller. Malloc can access and set the hidden tag metadata by using the LoadMetadata and StoreMetadata instructions. Similarly, when freeing allocated memory via the free routine, the memory manager may access the memory tag location for the size of the freed memory, setting the hidden tag metadata to another value to prevent use-after-free of the previous pointer identification tags, thus, preventing use-after-free exploits.

Figure 6B:
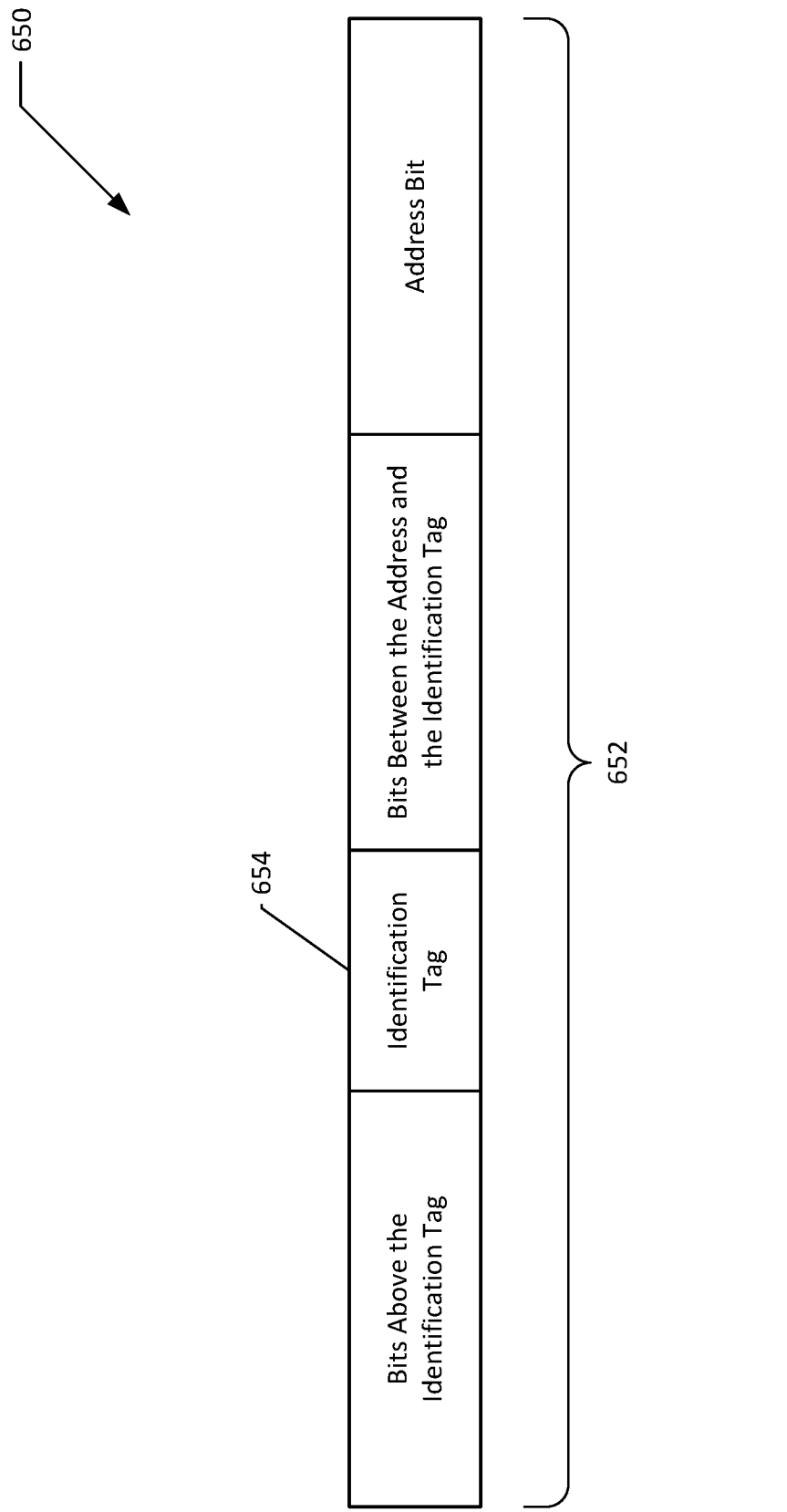
FIG. 6B illustrates a block diagram of a virtual memory address that illustrates that an identification tag may be stored in various locations within the virtual memory address.

FIG. 6B illustrates a block diagram 650 of a virtual memory address 652 that illustrates that an identification tag 654 (e.g., a color tag) may be stored in various locations within the virtual memory address. The identification tag 654 may occupy one or more bits within the virtual memory address 652 such that the virtual memory address 652 includes one or more bits above the identification tag 654 and one or more bits between the identification tag and the portion of the virtual memory address that is translated into the physical address (e.g., through a translation lookaside buffer).

Figure 7:
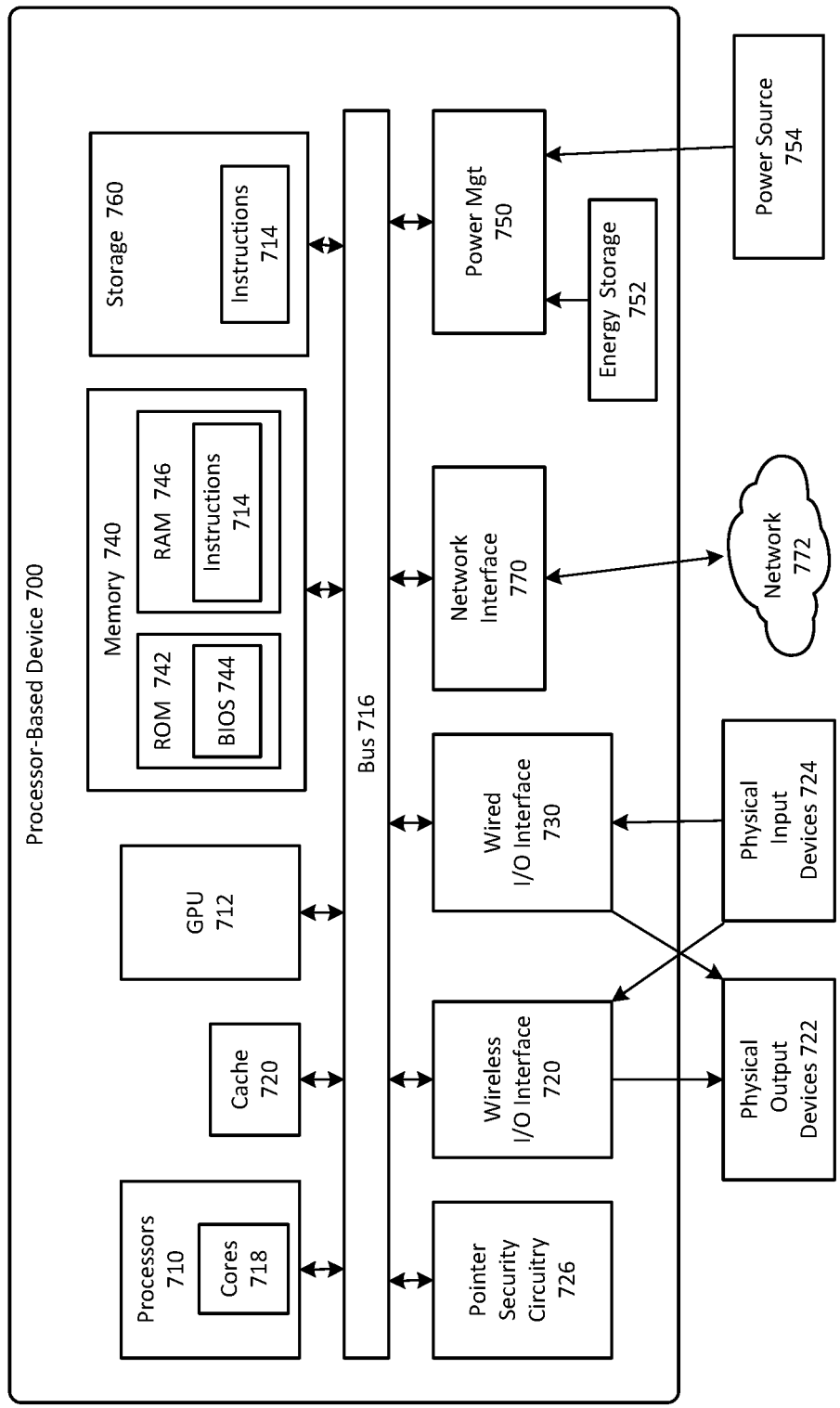
FIG. 7 is a block diagram of a system for using various memory tags to secure memory against side-channel attacks, in accordance with at least one embodiment described herein.

FIG. 7 is a schematic diagram of an illustrative electronic, processor-based, device 700 that includes pointer security circuitry 726 configured to use various memory tags to secure memory against side-channel attacks, in accordance with at least one embodiment described herein. The processor-based device 700 may additionally include one or more of the following: one or more processors 710 including processor cores 718, cache 720, a graphical processing unit (GPU) 712, a wireless input/output (I/O) interface 720, a wired I/O interface 730, memory circuitry 740, power management circuitry 750, non-transitory storage device 760, and a network interface 770. The following discussion provides a brief, general description of the components forming the illustrative processor-based device 700. Example, non-limiting processor-based devices 700 may include: smartphones, wearable computers, portable computing devices, handheld computing devices, desktop computing devices, blade server devices, workstations, and similar.

In embodiments, the processor-based device 700 includes processor cores 718 capable of executing machine-readable instruction sets 714, reading data and/or instruction sets 714 from one or more storage devices 760 and writing data to the one or more storage devices 760. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 718 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The processor-based device 700 includes a bus or similar communications link 716 that communicably couples and facilitates the exchange of information and/or data between various system components including the processor cores 718, the cache 720, the graphics processor circuitry 712, one or more wireless I/O interfaces 720, one or more wired I/O interfaces 730, one or more storage devices 760, and/or one or more network interfaces 770. The processor-based device 700 may be referred to in the singular herein, but this is not intended to limit the embodiments to a single processor-based device 700, since in certain embodiments, there may be more than one processor-based device 700 that incorporates, includes, or contains any number of communicably coupled, collocated, or remote networked circuits or devices.

The processor cores 718 may include any number, type, or combination of currently available or future developed devices capable of executing machine-readable instruction sets.

The processor cores 718 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 7 are of conventional design. Consequently, such blocks need not be described in further detail herein, as they will be understood by those skilled in the relevant art. The bus 716 that interconnects at least some of the components of the processor-based device 700 may employ any currently available or future developed serial or parallel bus structures or architectures.

The system memory 740 may include read-only memory ("ROM") 742 and random-access memory ("RAM") 746. A portion of the ROM 742 may be used to store or otherwise retain a basic input/output system ("BIOS") 744. The BIOS 744 provides basic functionality to the processor-based device 700, for example by causing the processor cores 718 to load and/or execute one or more machine-readable instruction sets 714. In embodiments, at least some of the one or more machine-readable instruction sets 714 cause at least a portion of the processor cores 718 to provide, create, produce, transition, and/or function as a dedicated, specific, and particular machine, for example a word processing machine, a digital image acquisition machine, a media playing machine, a gaming system, a communications device, a smartphone, or similar.

The processor-based device 700 may include at least one wireless input/output (I/O) interface 720. The at least one wireless I/O interface 720 may be communicably coupled to one or more physical output devices 722 (tactile devices, video displays, audio output devices, hardcopy output devices, etc.). The at least one wireless I/O interface 720 may communicably couple to one or more physical input devices 724 (pointing devices, touchscreens, keyboards, tactile devices, etc.). The at least one wireless I/O interface 720 may include any currently available or future developed wireless I/O interface. Example wireless I/O interfaces include, but are not limited to: BLUETOOTH®, near field communication (NFC), and similar.

The processor-based device 700 may include one or more wired input/output (I/O) interfaces 730. The at least one wired I/O interface 730 may be communicably coupled to one or more physical output devices 722 (tactile devices, video displays, audio output devices, hardcopy output devices, etc.). The at least one wired I/O interface 730 may be communicably coupled to one or more physical input devices 724 (pointing devices, touchscreens, keyboards, tactile devices, etc.). The wired I/O interface 730 may include any currently available or future developed I/O interface. Example wired I/O interfaces include, but are not limited to: universal serial bus (USB), IEEE 1394 ("FireWire"), and similar.

The processor-based device 700 may include one or more communicably coupled, nontransitory, data storage devices 760. The data storage devices 760 may include one or more hard disk drives (HDDs) and/or one or more solid-state storage devices (SSDs). The one or more data storage devices 760 may include any current or future developed storage appliances, network storage devices, and/or systems. Non-limiting examples of such data storage devices 760 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 760 may include one or more removable storage devices, such as one or more flash drives, flash memories, flash storage units, or similar appliances or devices capable of communicable coupling to and decoupling from the processor-based device 700.

The one or more data storage devices 760 may include interfaces or controllers (not shown) communicatively coupling the respective storage device or system to the bus 716. The one or more data storage devices 760 may store, retain, or otherwise contain machine-readable instruction sets, data structures, program modules, data stores, databases, logical structures, and/or other data useful to the processor cores 718 and/or graphics processor circuitry 712 and/or one or more applications executed on or by the processor cores 718 and/or graphics processor circuitry 712. In some instances, one or more data storage devices 760 may be communicably coupled to the processor cores 718, for example via the bus 716 or via one or more wired communications interfaces 730 (e.g., Universal Serial Bus or USB); one or more wireless communications interfaces 720 (e.g., Bluetooth®, Near Field Communication or NFC); and/or one or more network interfaces 770 (IEEE 802.3 or Ethernet, IEEE 802.11, or WiFi®, etc.).

Processor-readable instruction sets 714 and other programs, applications, logic sets, and/or modules may be stored in whole or in part in the system memory 740. Such instruction sets 714 may be transferred, in whole or in part, from the one or more data storage devices 760. The instruction sets 714 may be loaded, stored, or otherwise retained in system memory 740, in whole or in part, during execution by the processor cores 718 and/or graphics processor circuitry 712.

The processor-based device 700 may include power management circuitry 750 that controls one or more operational aspects of the energy storage device 752. In embodiments, the energy storage device 752 may include one or more primary (i.e., non-rechargeable) or secondary (i.e., rechargeable) batteries or similar energy storage devices. In embodiments, the energy storage device 752 may include one or more supercapacitors or ultracapacitors. In embodiments, the power management circuitry 750 may alter, adjust, or control the flow of energy from an external power source 754 to the energy storage device 752 and/or to the processor-based device 700. The power source 754 may include, but is not limited to, a solar power system, a commercial electric grid, a portable generator, an external energy storage device, or any combination thereof.

For convenience, the processor cores 718, the graphics processor circuitry 712, the wireless I/O interface 720, the wired I/O interface 730, the storage device 760, and the network interface 770 are illustrated as communicatively coupled to each other via the bus 716, thereby providing connectivity between the above-described components. In alternative embodiments, the above-described components may be communicatively coupled in a different manner than illustrated in FIG. 7. For example, one or more of the above-described components may be directly coupled to other components, or may be coupled to each other, via one or more intermediary components (not shown). In another example, one or more of the above-described components may be integrated into the processor cores 718 and/or the graphics processor circuitry 712. In some embodiments, all or a portion of the bus 716 may be omitted and the components are coupled directly to each other using suitable wired or wireless connections.

Figure 8:
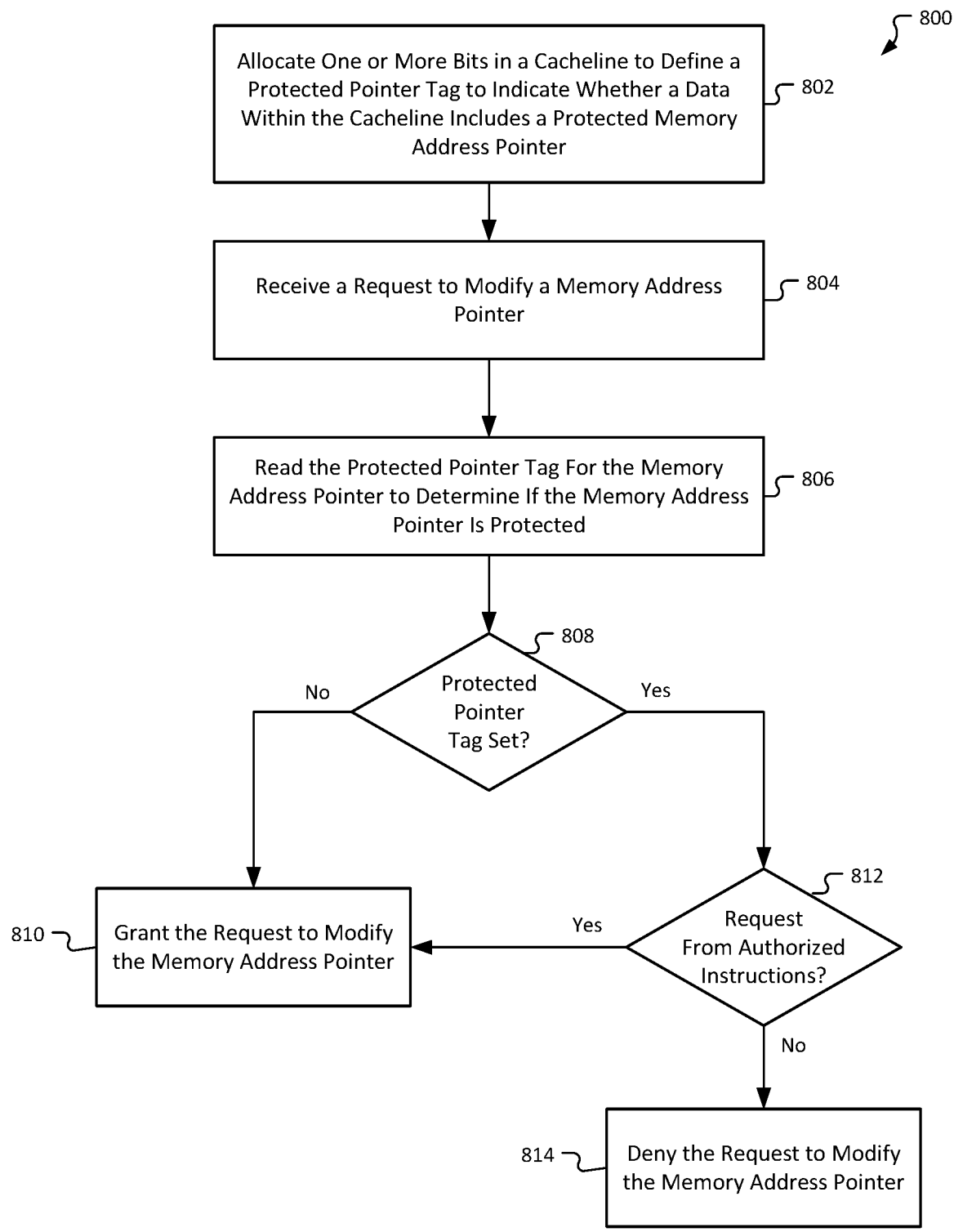
FIG. 8 is a flow diagram of a process for using memory tagging to provide an isolated environment ("a sandbox") for untrusted software, in accordance with at least one embodiment described herein.

FIG. 8 illustrates a flow diagram of a method 800 for using memory tagging to provide an isolated environment ("a sandbox") for untrusted software, consistent with embodiments of the present disclosure. The isolated environment may include hardware (e.g., the pointer security circuitry 426 shown in FIG. 4) and may include firmware, software, or other instructions (e.g., the pointer security instructions 458 shown in FIG. 4).

At operation 802, the method 800 allocates one or more bits in a cacheline to define a protected pointer tag to indicate whether data within the cacheline includes a protected memory address pointer, according to an embodiment. The data within the cacheline may be a word of data.

At operation 804, the method 800 receives a request to modify a memory address pointer, according to an embodiment.

At operation 806, the method 800 reads the protected pointer tag for the memory address pointer to determine if the memory address pointer is protected, according to an embodiment.

At operation 808, the method 800 determines whether the protected pointer tag is set, according to an embodiment. If the protected pointer tag is not set, operation 808 proceeds to operation 810. If the protected pointer tag is set, operation 808 proceeds to operation 812.

At operation 810, the method 800 grants the request to modify the memory address pointer, according to one embodiment.

At operation 812, the method 800 determines whether the request to modify the memory address pointer was made with authorized pointer security instructions. If the request was made with authorized pointer security instructions, operation 812 proceeds to operation 810, where the request is granted. If the request was not made with authorized pointer security instructions, operation 812 proceeds to operation 814, wherein the request is denied.

Embodiments of the disclosed technology may be used to sandbox untrusted software. Other usages described herein (memory tagging, capabilities, integrity, etc.) may also be applied to various memory data types (float, integer, string, pointer (e.g., stack pointer), address (e.g., return address), etc.), control registers (CR3 (used in relation to translating linear addresses into physical addresses), IDTR (Interrupt Descriptor Table Register)), buffer length (off-by-one byte detection), and Integrity Check Value/MAC (detects memory corruption), by using hidden inline metadata to indicate a data type as described below.

In various embodiments, hidden inline metadata may indicate a data type (float, integer, string, pointer (e.g., stack pointer), address (e.g., return address), etc.).

In an embodiment, hidden inline metadata may be used to determine if data identified as a 128-bit floating bit number is being loaded into an integer port on the processor for manipulation in a general-purpose register instead of a floating point or AVX register (as expected given its data type). For example, 128-bit SIMD data types in memory may be associated with SIMD registers XXM0-XXM15, 256-bit AVX data types may be associated with SIMD registers YMM0-YMM15, and 512-bit AVX data types may be associated with SIMD registers ZMM0-ZMM31. Likewise, an attempt to operate on a data representing integer number as if it were a floating-point number may be detected by checking the associated hidden inline data type when the processor prepares to perform the operation by loading the data into a processor port or register associated with floating-point operations. When memory containing a first data type is loaded into a port or register associated with a second data type, and the first and second data types are different, incompatible, and/or yield an unexpected or undesired result when compared, the processor may generate an exception or fault or otherwise indicate a potential error to software (for example, by setting a flag in a flags register, eflags, rflags, etc.). Strongly-typed languages may further use hidden inline metadata to determine exactly which general purpose register (GPR), index register, segment register, or control register is to be used with strongly-typed data. For example, loading of the EDI register may be restricted to loading index variables from memory by labeling them as index DI or EDI type, with the appropriate size as expected by the processor mode and register type; while other uses may result in an error to software.

Similarly, registers that are used to access memory, for example pointers in C/C++, when loaded into registers used to access memory, may be of the memory operand type in their corresponding hidden inline metadata. Similar to Memory Protection Extensions (Intel MPX) bounds tables, bounds information for pointers in memory may be stored in hidden inline metadata. This hidden inline metadata information may be used to simultaneously set the corresponding bounds register when loading pointers from memory, removing the need for MPX bounds table lookups and the associated performance and memory overheads. Similarly, for memory tagging embodiments, pointer tags may be stored in the pointer's associated hidden inline meta data. In this way, when a processor loads a pointer type from memory, it may use the tag value associated with that pointer from its hidden inline metadata. It may be desired, instead of stealing address bits from the linear/virtual address for use by memory tagging extensions (MTE), to fully utilize the linear address for memory addressing, and store the tag in the associated hidden inline metadata for the pointer. The processor may then match the pointer's tag with the tag in the associated data referenced by the pointer, to detect use-after-free and other error cases. Storing the tag in hidden inline metadata instead of with the pointer may prevent exposure of the tag value to an adversary, improving the security of memory tagging. Furthermore, the hidden inline metadata may only allow tags to be set by privileged or authorized software (e.g., a memory allocator or memory manager).

In an embodiment, in connection with the execution of a call instruction (e.g., CALL), data representing a return vector may be placed on a call stack, and hidden metadata may identify the data as a return vector type. That is, pages associated with the call stack may be set (e.g., by the kernel), in their associated page table entries, as containing hidden inline metadata, and a CALL instruction may be allowed to set the associated metadata for return vectors it places on the stack to indicate they are of the return vector type. Then, when a return instruction (e.g., RET) attempts to transfer control flow based on data that is not of the return vector type, a fault or exception may be triggered to avoid a return-oriented programming attack. Otherwise, the RET instruction will verify the return vector data has a corresponding hidden inline metadata type set to return vector type and will proceed to transfer execution control (set the instruction pointer) to the associated return vector address and continue program execution. Additionally, after taking the return vector, the processor may reset the return vector type to prevent future uses of that taken return vector; and/or, in response to software attempting (not through a call instruction) to modify or overwrite data of a return vector type, a return-oriented programming attack may be avoided by the processor resetting or otherwise changing the data type indicated by the hidden metadata, from the return vector type to a different data type.

Similarly, interrupts may save, on the stack, processor state including a return vector to the location where execution of the program was interrupted. This interrupt return vector may be typed as an interrupt return vector type. Then, the return from interrupt instruction (e.g., iRET) may check for this corresponding data before returning to the interrupted program flow and may reset the data type to prevent attempts (e.g., by an adversary) to reuse the interrupt return vector and/or may trigger an exception or fault to indicate the incorrect data type for the interrupt return vector on the stack. For security purposes, only the processor via the CALL or RET or iRET instructions may be allowed to set the data type indicating a return vector, or resetting that information, thus preventing a software adversary from accessing the hidden inline metadata and manipulating these special values for maintaining proper program control flow integrity. This provides the equivalent functional of Control-flow Enforcement Technology (CET), but, advantageously, without requiring an additional protected shadow stack to separately store return vectors of the call stack.

In embodiments, PUSH and POP instructions may, respectively, store and load the corresponding data type of the registers being loaded or stored from the corresponding hidden inline metadata on the stack. When the PUSH instruction is used to save a register on the stack, the register type may also be stored in the corresponding hidden inline metadata. Then, when a POP instruction is used to pop data off the stack into a register, the hidden inline metadata type may be used by the processor to verify the correct register is being loaded, or else indicate an error to software.

In an embodiment, hidden metadata may be used to indicate that data representing a stack pointer is of a stack pointer type, and an attempt by software to change the value of data of a stack pointer type may trigger a response by a processor, such as changing the type of the data such that the data is not of a stack pointer type such that it may not be used as a stack pointer, to avoid a stack-based control flow attack or a programming error that erroneously sets the program stack pointer (SP, ESP, RSP, etc.) to data in memory that does not correspond to the top address of a program stack. Similarly, the stack base pointer (BP, EBP, RBP, etc.) may have an associated hidden inline metadata type indicating the start of the current stack frame (or this can be implicit given the relative location of the return vector to the start of a new stack frame).

Control flow integrity may be further assisted by hidden inline metadata when applied to code (processor instructions stored in memory). For example, the branch target of an indirect branch or direct branch may be labeled as such in the hidden inline metadata for a code page. Thus, instead of the endbranch instruction associated with CET, hidden inline metadata may be used to indicate the branch target or the first instruction sequence associated with a branch target, and branch targets may be individually labeled as direct or indirect to indicate which type of branching instructions are allowed to execute those branch targets. Attempts to branch to code paths that are not labeled as a branch target type in the respective hidden inline metadata for the code will result in the processor generating an exception or fault or other error indication to software.

In an embodiment, hidden inline metadata for code may be used to indicate permissions or privileges associated with that code. For example, only code paths labeled as memory allocation code paths may be allowed to execute instructions associated with setting or reading tags from memory, that is, calling the instructions to read or write hidden inline metadata. This provides a mechanism to access control what code is allowed to do without requiring a ring transition to more privileged modes (such as the kernel running in ring 0 or supervisor mode). Here, for example, supervisor mode code may tag certain user space code with special or specific permissions by setting the corresponding hidden inline metadata (to indicate the special or specific permissions or privileges) for those instructions. Then, only the such designated user space code may call the instructions used to set and get the hidden inline metadata from within user space (e.g., with ring 3 or user privileges) without requiring transitions back to the kernel (supervisor mode).

In an embodiment, hidden inline metadata may be used to access control which code paths may access what data. That is, hidden inline metadata tags associated with code may be matched with the same hidden inline tag values for data in memory. The processor may enforce that only code with the same hidden inline tag value as the data will have the ability to access the associated data. Some tags may indicate a special value (e.g., ANY) to indicate privileges for code to access any data regardless of the associated hidden inline data tag value. Likewise, privileges may indicate permission, such as code being restricted to read any data but be limited to only write to data with hidden inline metadata tags matching the hidden inline metadata tag of the code accessing the data.

In an embodiment, hidden metadata may be used to indicate that data is of a pointer type for a page table, page directory, and/or other paging data structure, and an attempt to load a base address storage location (e.g., CR3) with data of a type other than the appropriate pointer type may trigger a processor response to protect memory. Some embodiments may extend hidden inline metadata to paging structures, for example, a page directory data type may be associated with the CR3 register, while page directories may be of the page table type, creating a hierarchy of type dependencies that may be verified by the processor (PMH or page miss handler) when walking a paging structure hierarchy.

In some embodiments, the use of hidden inline metadata may be extended to virtualization technology. For example, an extended page table pointer (EPTP) or nested page table pointer may be restricted to be loadable only with memory references of the EPTP type for identifying valid references to extended paging structures. Similarly, references to virtual machine control structures (VMCS) or virtual machine control blocks as used by a VMPTRLD or other corresponding instruction may be labeled as a VMCS type using hidden inline metadata. A VMM may then apply hidden inline metadata to a VM's memory, for example, indicating when a code path (instruction) execution or data access by the VM will trigger a VM exit or change of control to the VMM. This method may be used for instrumenting code paths within a VM for providing virtualization services instead of modifying code paths directly with the VM. In these embodiments, the VM (guest mode) does not have access to the hidden inline metadata, only the VMM or code being executed in a root mode has access. Extended page table entries may then indicate, similarly to the metadata bit in page table entries, when a VM's page has hidden inline metadata and the processor should utilize and hide the inline metadata from the VM.

Hidden inline metadata may also be used to detect physical errors. For example, checksum or error correcting code (ECC) or cryptographic message authentication code (MAC) values may be stored in the hidden inline metadata (e.g., as a data integrity value). In such embodiments, when a processor writes (stores) data to a cacheline, it may also calculate the data integrity value for that data and store it to the data slot's corresponding hidden inline integrity value. Then, when reading (loading) the data again, the processor may check whether the hidden inline integrity value matches the corresponding data within the cacheline. If the integrity value does not correspond to the data value, then an error was detected and an exception or fault or other error may be indicated to software. In this way, physical errors and security attacks on data may be detected by the processor. Hidden inline metadata including error correcting codes (such as Reed-Solomon codes) may further be used to correct physical errors on data before they are consumed by the processor.

Other embodiments using hidden metadata to indicate these and other data types are possible within the scope of the invention. In each of these embodiments, whether specifically described or otherwise, protection against speculation-based attacks may be provided because a data type, and therefore a decision regarding whether access to the corresponding data is allowed, may be available concurrently with the availability of the data, potentially making speculative execution unnecessary, as the hidden inline metadata is stored on the same cacheline as its associated data, allowing hardware to utilize the metadata information in parallel without needing to wait for additional memory accesses for fetching metadata.

In some embodiments, a processor includes a processor core and cache memory. The processor core is to implant hidden inline metadata in one or more cachelines for the cache memory, the hidden inline metadata hidden at a linear address level, the hidden inline metadata to indicate data type associated with data occupying the same cacheline.

In some embodiments, an apparatus includes a plurality of processor cores; a computer memory for storage of data; and cache memory communicatively coupled with one or more of the processor cores, wherein one or more processor cores of the plurality of processor cores are to implant hidden inline metadata in one or more cachelines for the cache memory, the hidden inline metadata being hidden at a linear address level, the hidden inline metadata to indicate data type.

In some embodiments, the hidden inline metadata is available for purposes for one or more of memory tagging, identification of capabilities, and fine grain memory access control.

In some embodiments, the processor or apparatus further includes pointer security circuitry to define a plurality of memory tags in memory address pointers; and encryption circuitry to cryptographically secure data objects at least partially based on the plurality of memory tags, wherein the hidden inline metadata for a first cacheline includes one or more memory tags. In some embodiments, the hidden inline metadata may be used to tag cachelines with a key identifier (KeyID) interpreted by a memory encryption engine in the memory controller to determine which key from a plurality of memory encryption keys is used to encrypt the tagged cacheline (for example, when used with Multi-key Total Memory Encryption or Intel MKTME).

In some embodiments, one or more processor cores are further to compare the one or more memory tags in the hidden inline metadata for the first cacheline with a memory pointer tag value in a linear address to determine whether a memory access is authorized.

In some embodiments, one or more processor cores are to compare the one or more memory tags of the first cacheline with the memory pointer tag at a same or overlapping time with data access to the cacheline.

In some embodiments, software run by one or more of the plurality of processor cores are to skip over one or more regions of memory for the metadata inserted in the one or more cachelines during loading or storing of linear addressed data.

In some embodiments, one or more processor cores are to set an indicator in a memory or storage to indicate presence of the hidden inline metadata in the one or more cachelines.

In some embodiments, the indicator includes one or more bits of a page table.

In some embodiments, one or more non-transitory computer-readable storage mediums having stored thereon executable computer program instructions that, when executed by one or more processors, cause the one or more processors to perform operations including implanting hidden inline metadata for one or more memory tags memory tags in one or more cachelines for a cache memory, the hidden inline metadata being hidden at a linear address level, the hidden inline metadata to indicate data type; and setting an indicator in a page table entry (metadata bit) to indicate presence of the hidden inline metadata in the one or more cachelines in the referenced page.

In some embodiments, the instructions include instructions for utilizing the hidden inline metadata for one or more of memory tagging, identification of capabilities, and fine grain memory access control.

In some embodiments, the instructions include instructions for utilizing the memory tags to detect one or more of use-after-free vulnerabilities or overflow/underflow conditions.

In some embodiments, the instructions include instructions for defining one or more memory tags in memory address pointers; and cryptographically securing data objects at least partially based on one or more of the memory tags, wherein the hidden inline metadata for a first cacheline includes one or more memory tags.

In some embodiments, the instructions include instructions for comparing the one or more memory tags in the hidden inline metadata for the first cacheline with a memory pointer tag value in a linear address and determining whether a memory access is authorized based at least in part on the comparison of the one or more memory tags to the memory pointer tag.

In some embodiments, access to the one or more memory tags of the first cacheline occurs in a same clock cycle as data access to the cacheline.

In some embodiments, one or more regions of memory for the metadata inserted in the one or more cachelines are skipped during loading or storing of linear addressed data.

In some embodiments, the instructions include instructions for setting an indicator in a memory or storage to indicate presence of the hidden inline metadata in the one or more cachelines.

In some embodiments, the indicator includes one or more bits of a page table. A metadata bit in a page table entry may indicate that the associated memory page contains hidden inline metadata and that the processor should operate on the page using the hidden inline metadata to verify tags, data types, code capabilities, and so on.

In some embodiments, a method includes implanting hidden inline metadata for one or more memory tags memory tags in one or more cachelines for a cache memory, the hidden inline metadata being hidden at a linear address level, the hidden inline metadata to indicate data type; and setting an indicator to indicate presence of the hidden inline metadata in the one or more cachelines.

In some embodiments, the method further includes utilizing the hidden inline metadata for one or more of memory tagging, identification of capabilities, and fine grain memory access control.

In some embodiments, the method further includes utilizing the memory tags to detect one or more of use-after-free vulnerabilities or overflow/underflow conditions.

In some embodiments, the method further includes defining one or more memory tags in memory address pointers; and cryptographically securing data objects at least partially based on one or more of the memory tags, wherein the hidden inline metadata for a first cacheline includes one or more memory tags.

In some embodiments, the method further includes comparing the one or more memory tags in the hidden inline metadata for the first cacheline with a memory pointer tag value in a linear address; and determining whether a memory access is authorized based at least in part on the comparison of the one or more memory tags to the memory pointer tag.

In some embodiments, access to the one or more memory tags of the first cacheline occurs in a same clock cycle as data access to the cacheline.

In some embodiments, the method further includes skipping one or more regions of memory for the metadata inserted in the one or more cachelines during loading or storing of linear addressed data.

In some embodiments, the method further includes setting an indicator in a memory or storage to indicate presence of the hidden inline metadata in the one or more cachelines.

In some embodiments, an apparatus includes means for implanting hidden inline metadata for one or more memory tags memory tags in one or more cachelines for a cache memory, the hidden inline metadata being hidden at a linear address level, the hidden inline metadata to indicate data type; and means for setting an indicator to indicate presence of the hidden inline metadata in the one or more cachelines.

In some embodiments, the apparatus further includes means for utilizing the hidden inline metadata for one or more of memory tagging, identification of capabilities, and fine grain memory access control.

In some embodiments, the apparatus further includes means for utilizing the memory tags to detect one or more of use-after-free vulnerabilities or overflow/underflow conditions.

In some embodiments, the apparatus further includes means for defining one or more memory tags in memory address pointers; and means for cryptographically securing data objects at least partially based on one or more of the memory tags, wherein the hidden inline metadata for a first cacheline includes one or more memory tags.

In some embodiments, the apparatus further includes means for comparing the one or more memory tags in the hidden inline metadata for the first cacheline with a memory pointer tag value in a linear address; and means for determining whether a memory access is authorized based at least in part on the comparison of the one or more memory tags to the memory pointer tag.

In some embodiments, access to the one or more memory tags of the first cacheline occurs in a same clock cycle as data access to the cacheline.

In some embodiments, the means for skipping one or more regions of memory for the metadata inserted in the one or more cachelines during loading or storing of linear addressed data.

In some embodiments, the apparatus further includes means for setting an indicator in a memory or storage to indicate presence of the hidden inline metadata in the one or more cachelines.

In some embodiments, a system may include a system memory and a processor as described above.

Exemplary Core, Processor, and System Architectures

Embodiments of the invention have been described and depicted with reference to a processor and/or a CPU, which may represent any of many different processors in which the invention is embodied in different ways and/or for different purposes. These processors and cores, for example as described below, may include hardware, such as caches and branch predictors, that improve performance but may make the processor and/or core more vulnerable to analysis that may be defended against according to embodiments of the invention.

For instance, implementations of cores in a processor in which the invention may be embodied may include: a general purpose in-order core intended for general-purpose computing; a high-performance general purpose out-of-order core intended for general-purpose computing; a special purpose core intended primarily for graphics and/or scientific (throughput) computing. Implementations of processors in which the invention may be embodied may include: a central processing unit (CPU) including one or more general purpose in-order cores intended for general-purpose computing and/or one or more general purpose out-of-order cores intended for general-purpose computing; and a coprocessor including one or more special purpose cores intended primarily for graphics and/or scientific (throughput) computing. Such different processors lead to different computer system architectures, which may include: the coprocessor on a separate chip from the CPU; the coprocessor on a separate die in the same package as a CPU; the coprocessor on the same die as a CPU (in which case, such a coprocessor is sometimes referred to as special purpose logic, such as integrated graphics and/or scientific (throughput) logic, or as special purpose cores); and a system on a chip (SoC) that may include on the same die the described CPU (sometimes referred to as the application core(s) or application processor(s)), the above described coprocessor, and additional functionality.

Exemplary core architectures are described next, followed by descriptions of exemplary processors and computer architectures. Each processor may include one or more cores, where each core and/or combination of cores may be architected and designed to execute one or more threads, processes, or other sequences of instructions at various times. Core architectures and design techniques may provide for and/or support the concurrent execution of multiple threads, according to any of a type of approaches known as simultaneous (or symmetric) multi-threading (SMT) or any other approach.

Further, as mentioned above and explained in more detail below, embodiments of the present disclosure may apply to any type of processor or processing element, including general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device. The processor or processors may be implemented on one or more chips. The processor or processors may be a part of and/or may be implemented on one or more substrates using any of a number of process technologies, such as, for example, BiCMOS, CMOS, or NMOS. The processors and processing devices listed above and described herein are exemplary; as explained herein, the present disclosure is applicable to any processor or processing device.

Further, as mentioned above and explained in more detail below, embodiments of the present disclosure may apply to processors or processing elements using a wide variety of instruction sets and instruction set architectures, including for example, the x86 instruction set (optionally including extensions that have been added with newer versions); the MIPS instruction set of MIPS Technologies of Sunnyvale, CA; the ARM instruction set (with optional additional extensions such as NEON) of ARM Holdings of Sunnyvale, CA; IBM's "Power" instruction set, or any other instruction set, including both RISC and CISC instruction sets. The instruction sets and instruction set architectures listed above and described herein are exemplary; as explained herein, the present disclosure is applicable to any instruction set or instruction set architecture.

Exemplary Core Architecture

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front-end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like. For example, as explained above, core 990 may be any member of a set containing: general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device.

The front-end unit 930 includes a branch prediction unit 932 coupled to a micro-op cache 933 and an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The micro-operations, micro-code entry points, microinstructions, etc. may be stored in at least the micro-op cache 933. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front-end unit 930). The micro-op cache 933 and the decode unit 940 are coupled to a rename/allocator unit 952 in the execution engine unit 950. In various embodiments, a micro-op cache such as 933 may also or instead be referred to as an op-cache, u-op cache, uop-cache, or pop-cache; and micro-operations may be referred to as micro-ops, u-ops, uops, and μops.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general-purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA, IBM's "Power" instruction set, or any other instruction set, including both RISC and CISC instruction sets), including the instruction(s) described herein. In one embodiment, the core 990 includes logic to support a packed data instruction set extension (e.g., AVX, AVX2, AVX-512), thereby allowing the operations used by many multimedia applications to be performed using packed data.

It should be understood that the core may support multithreading (executing two or more parallel sets of operations or threads), and may do so in a variety of ways including time sliced multithreading, SMT (e.g., a single physical core provides a logical core for each of the threads that physical core is simultaneously multithreading), or a combination thereof (e.g., time sliced fetching and decoding, and SMT thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache(s) may be external to the core and/or the processor.

Exemplary Processor Architectures

Figure 10:
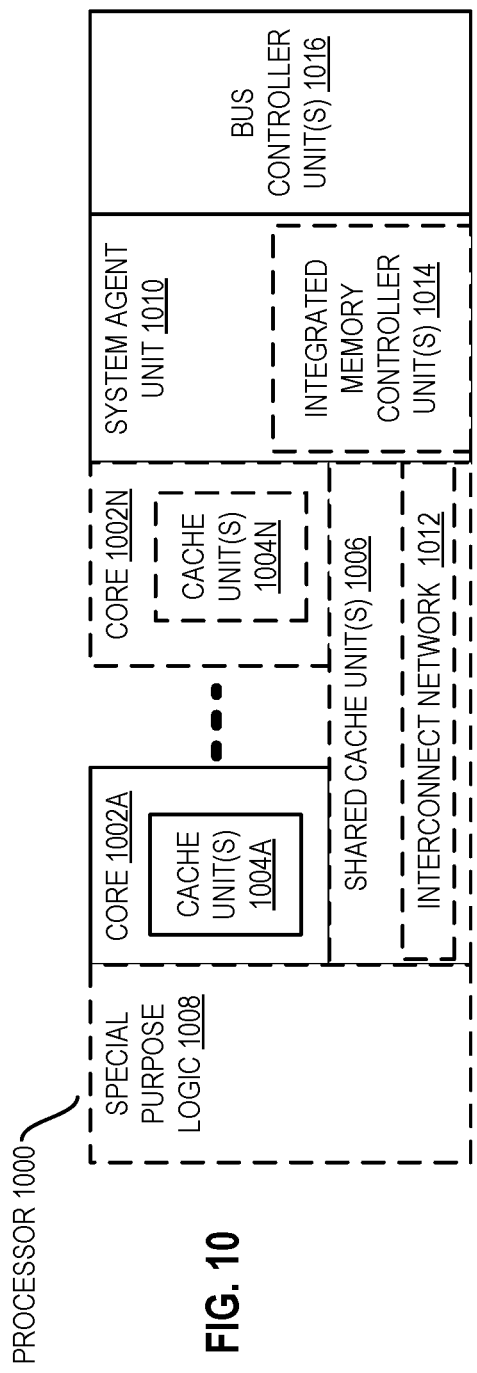
FIG. 10 is a block diagram of a processor that may have more than one core, may have an integrated memory controller, and may have integrated graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); 3) a coprocessor with the cores 1002A-N being a large number of general purpose in-order cores; and 4) the cores 1002A-N representing any number of disaggregated cores with a separate input/output (I/O) block. Thus, the processor 1000 may be a general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring-based interconnect unit 1012 interconnects the integrated graphics logic 1008 (integrated graphics logic 1008 is an example of and is also referred to herein as special purpose logic), the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002A-N.

In some embodiments, one or more of the cores 1002A-N are capable of multithreading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), general-purpose processors, server processors or processing elements for use in a server-environment, coprocessors (e.g., security coprocessors) high-throughput MIC processors, GPGPU's, accelerators (such as, e.g., graphics accelerators, cryptographic accelerators, fixed function accelerators, machine learning accelerators, networking accelerators, or computer vision accelerators), field programmable gate arrays, or any other processor or processing device, graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
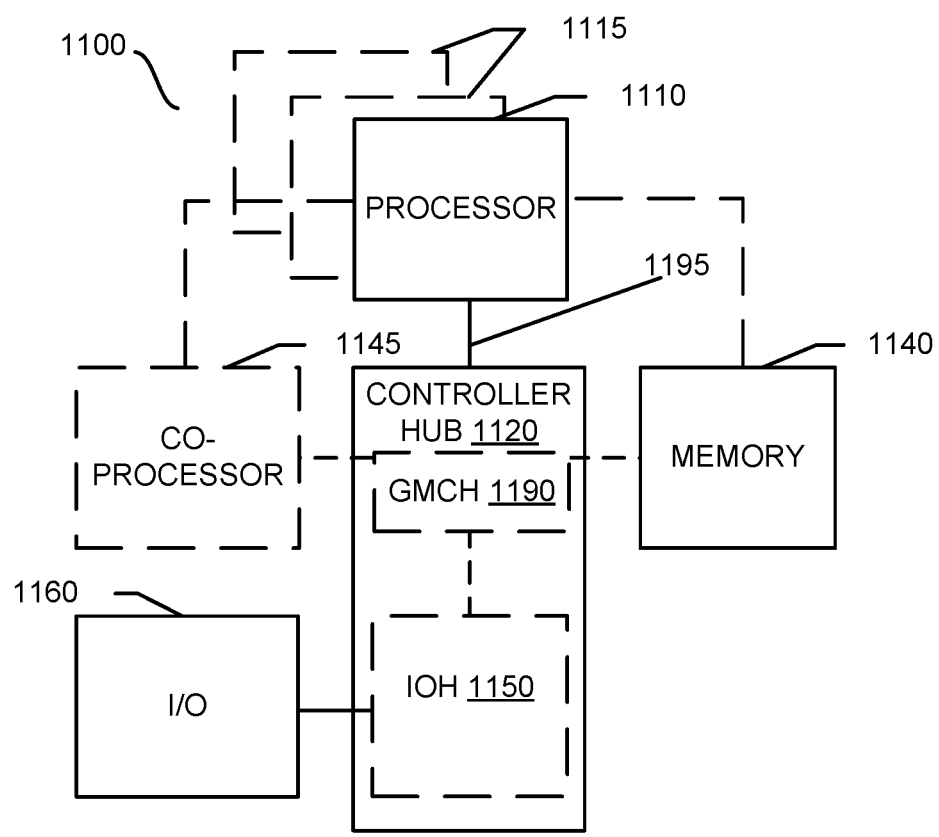
FIGS. 11-14 are block diagrams of exemplary computer architectures.

Referring now to FIG. 11, shown is a block diagram of a system 1100 in accordance with one embodiment of the present invention. The system 1100 may include one or more processors 1110, 1115, which are coupled to a controller hub 1120. In one embodiment, the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 couples I/O devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random-access memory (DRAM), phase change memory (PCM), or a combination of the two. For at least one embodiment, the controller hub 1120 communicates with the processor(s) 1110, 1115 via a multi-drop bus, such as a front-side bus (FSB), point-to-point interface such as QuickPath Interconnect (QPI), or similar connection 1195.

In one embodiment, the coprocessor 1145 is a special-purpose processor (including, e.g., general-purpose processors, server processors or processing elements for use in a server-environment, coprocessors such as security coprocessors, high-throughput MIC processors, GPGPU's, accelerators, such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device). In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
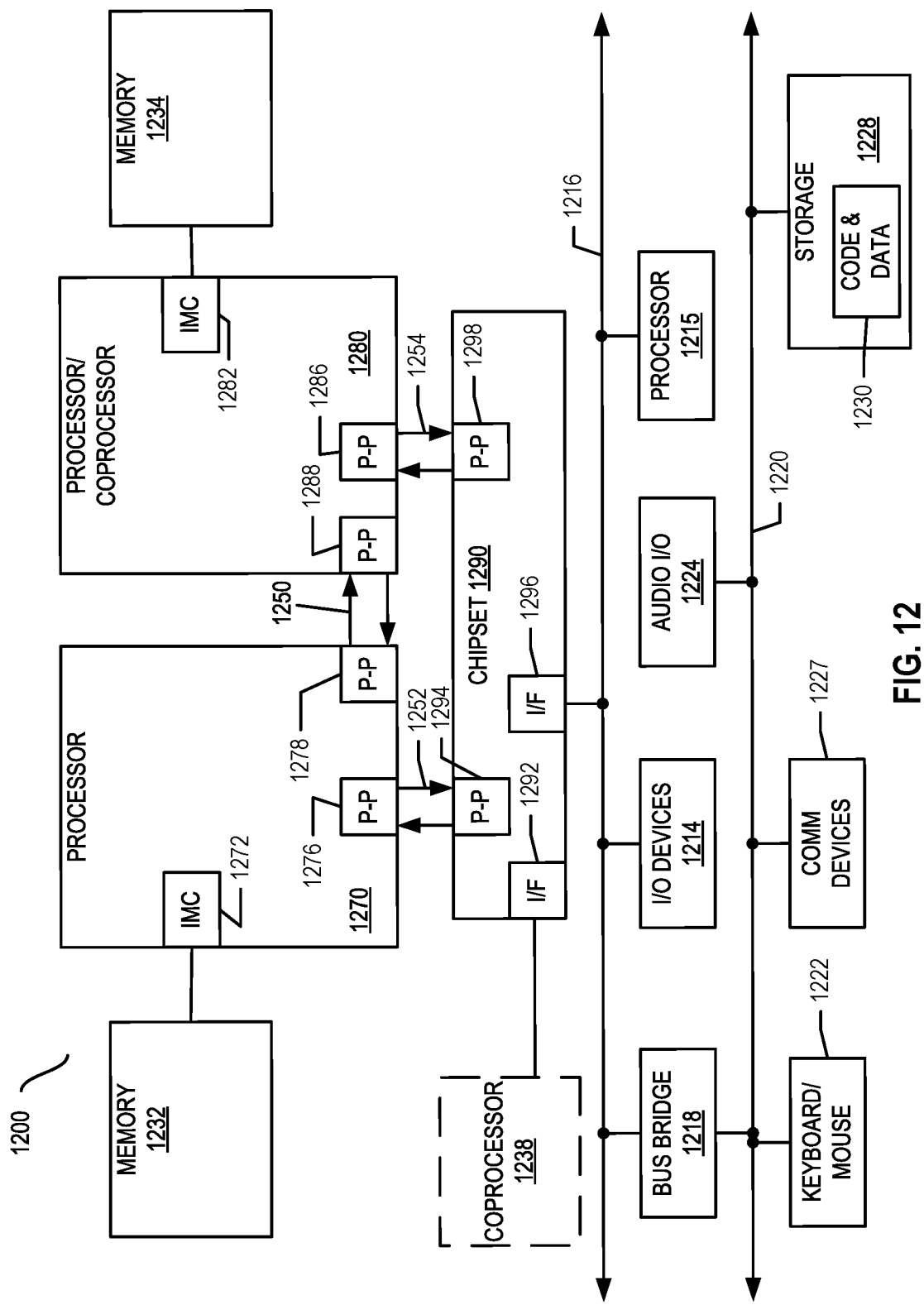

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller unit's point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1292. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
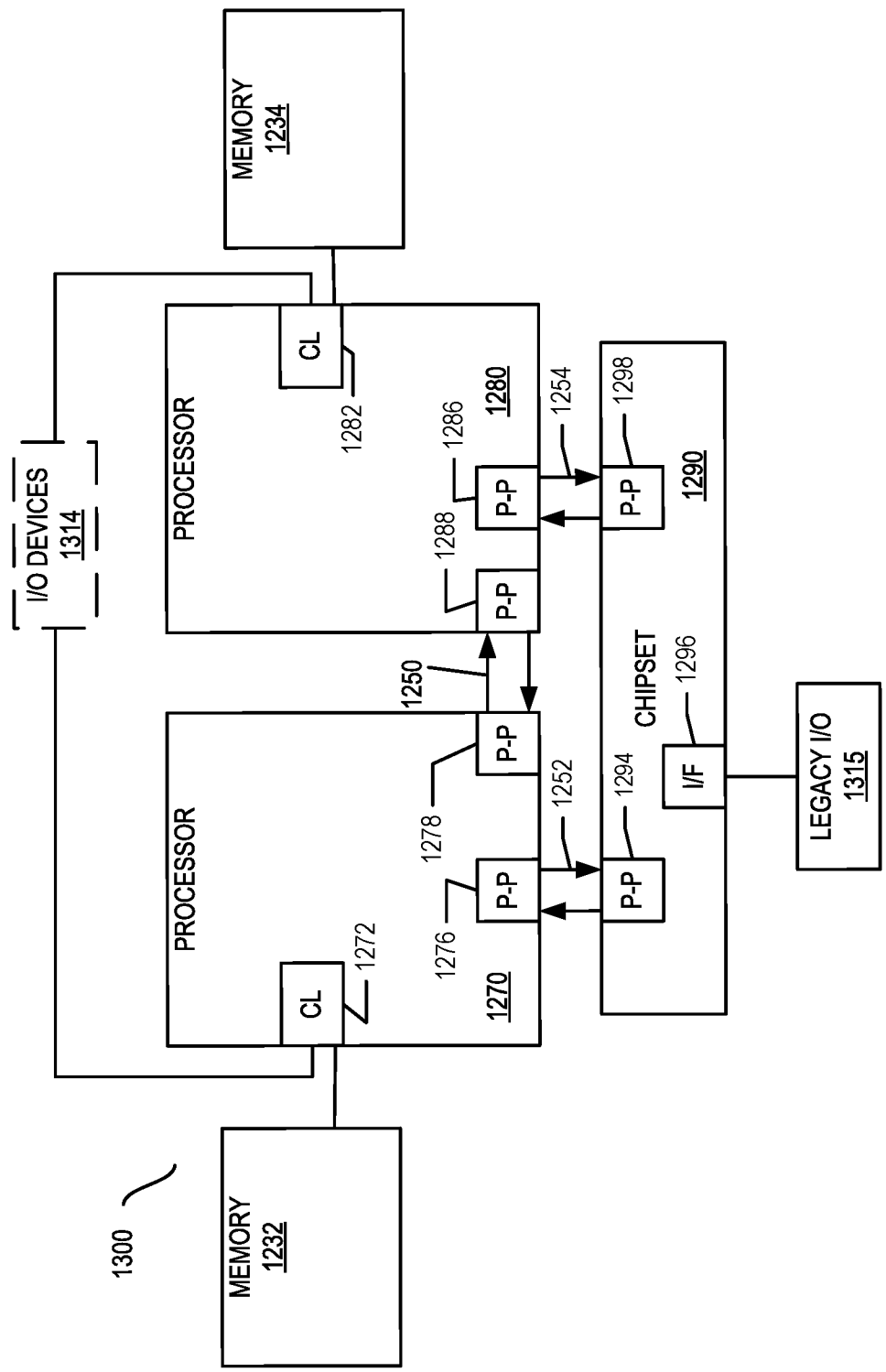

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
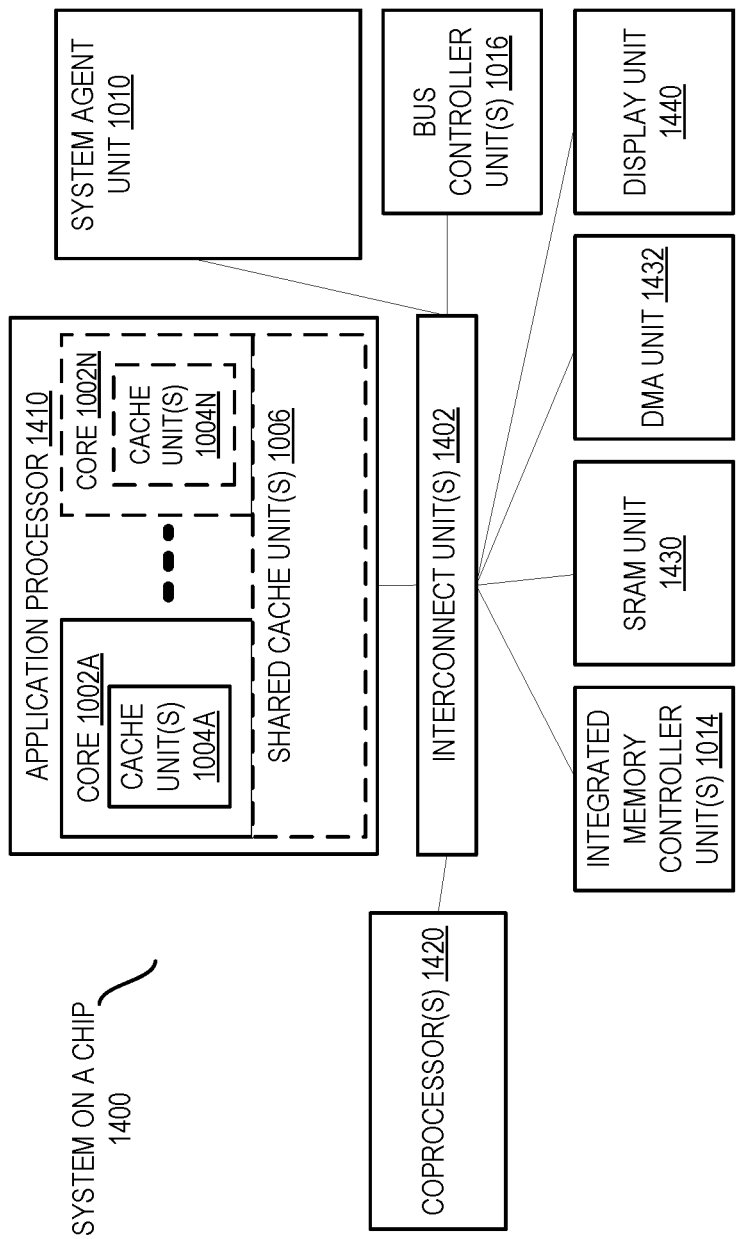

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 1002A-N, which include cache units 1004A-N, and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor, general-purpose processors, server processors or processing elements for use in a server-environment, security coprocessors, high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

CONCLUDING REMARKS

Embodiments of the mechanisms disclosed herein may be implemented in hardware, software, firmware, or a combination of such implementation approaches. Embodiments of the invention may be implemented as computer programs or program code executing on programmable systems comprising at least one processor, including, e.g., general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Instructions to be executed by a processor core according to embodiments of the invention may be embodied in a "generic vector friendly instruction format" which is detailed below. In other embodiments, such a format is not utilized and another instruction format is used, however, the description below of the write-mask registers, various data transformations (swizzle, broadcast, etc.), addressing, etc. is generally applicable to the description of the embodiments of the instruction(s) above. Additionally, exemplary systems, architectures, and pipelines are detailed below. Instructions may be executed on such systems, architectures, and pipelines, but are not limited to those detailed.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high-level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, CA and/or that execute the ARM instruction set of ARM Holdings of Sunnyvale, CA). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A processor comprising:
   a processor core; and
   cache memory including one or more cachelines;
   wherein the processor core includes hardware to hide, at a linear address level, metadata on a same cacheline as data, wherein the metadata is to indicate one of a plurality of data types, the plurality of data types including at least one of a return vector type, an interrupt return vector type, a register type, a stack and a branch target type.

2. The processor of claim 1, wherein the metadata is available for purposes of one or more of memory tagging, identification of capabilities, and fine grain memory access control.

3. The processor of claim 1, further comprising:
   pointer security circuitry to define a plurality of memory tags in memory address pointers; and
   encryption circuitry to cryptographically secure data objects at least partially based on the plurality of memory tags;
   wherein the metadata for the cacheline includes one or more memory tags.

4. The processor of claim 3, wherein the processor core is further to compare the one or more memory tags in the metadata for the cacheline with a memory pointer tag value in a linear address to determine whether a memory access is authorized.

5. The processor of claim 4, wherein the processor core is to compare the one or more memory tags of the cacheline with the memory pointer tag at a same or overlapping time with data access to the cacheline.

6. The processor of claim 1, wherein software run by the processor core is to skip over one or more regions of memory for the metadata inserted in the cacheline during loading or storing of the data.

7. The processor of claim 1, wherein the processor core is to set an indicator in a memory or storage to indicate presence of the metadata in the cacheline.

8. The processor of claim 7, wherein the indicator includes one or more bits of a page table.

9. A method comprising:
   hiding, at a linear address level, metadata for a memory tag on a same cacheline as data, wherein the metadata indicates one of a plurality of data types, the plurality of data types including at least one of a return vector type, an interrupt return vector type, and a branch target type; and setting an indicator to indicate presence of the metadata in the cacheline.

10. The method of claim 9, further comprising:
comparing the memory tag in the metadata for the cacheline with a memory pointer tag value in a linear address; and
determining whether a memory access is authorized based at least in part on the comparison of the memory tag to the memory pointer tag.

11. The method of claim 10, wherein access to the memory tag of the cacheline occurs in a same clock cycle as data access to the cacheline.

12. One or more non-transitory computer-readable storage mediums having stored thereon executable computer program instructions that, when executed by one or more processors, cause the one or more processors to perform operations comprising:
hiding, at a linear address level, metadata for a memory tag on a same cacheline as data, wherein the metadata indicates one of a plurality of data types, the plurality of data types including at least one of a return vector type, an interrupt return vector type, and a branch target type; and
setting an indicator to indicate presence of the metadata in the cacheline.

13. The one or more mediums of claim 12, wherein the instructions include instructions for utilizing the metadata for one or more of memory tagging, identification of capabilities, and fine grain memory access control.

14. The one or more mediums of claim 12, wherein the instructions include instructions for:
utilizing the memory tag to detect one or more of use-after-free vulnerabilities or overflow/underflow conditions.

15. The one or more mediums of claim 12, wherein the instructions include instructions for:
defining the memory tag in a memory address pointer; and
cryptographically securing data objects at least partially based on the memory tag;
wherein the metadata for the cacheline includes the memory tag.

16. The one or more mediums of claim 15, wherein the instructions include instructions for:
comparing the memory tag in the metadata for the cacheline with a memory pointer tag value in a linear address; and
determining whether a memory access is authorized based at least in part on the comparison of the memory tag to the memory pointer tag.

17. The one or more mediums of claim 16, wherein access to the memory tag of the cacheline occurs in a same clock cycle as data access to the cacheline.

18. The one or more mediums of claim 12, wherein one or more regions of memory for the metadata inserted in the cacheline are skipped during loading or storing of linear addressed data.

19. The one or more mediums of claim 12, wherein the instructions include instructions for:
setting an indicator in a memory or storage to indicate presence of the metadata in the cacheline.

20. The one or more mediums of claim 19, wherein the indicator includes one or more bits of a page table.

* * * * *